(12) United States Patent
Miyairi et al.

(10) Patent No.: US 6,497,929 B1
(45) Date of Patent: Dec. 24, 2002

(54) LIQUID CRYSTAL COMPOSITION AND LIQUID CRYSTAL DISPLAY DEVICE

(75) Inventors: Takahiro Miyairi; Yasuhiro Kubo; Etsuo Nakagawa, all of Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 129 days.

(21) Appl. No.: 09/695,238

(22) Filed: Oct. 25, 2000

(30) Foreign Application Priority Data

Oct. 25, 1999 (JP) .......................................... 11-303009

(51) Int. Cl.$^7$ ........................ C09K 19/30; C09K 19/12; C09K 19/42
(52) U.S. Cl. ............... 428/1.1; 252/299.63; 252/299.66
(58) Field of Search ....................... 252/299.63, 299.66; 428/1.1

(56) References Cited

U.S. PATENT DOCUMENTS 5,589,102 A    12/1996   Bartmann et al. ...... 252/299.01
6,315,922 B1 * 11/2001   Takeshita et al. ...... 252/299.61

(List continued on next page.)

FOREIGN PATENT DOCUMENTS

DE    199 43 358    4/2000
EP    0 786 445    7/1997

(List continued on next page.)

*Primary Examiner*—Shean C. Wu
(74) *Attorney, Agent, or Firm*—Wenderoth, Lind & Ponack, L.L.P.

(57) ABSTRACT

A liquid crystal composition having a high voltage holding ratio especially at a high temperature region, a wide range of a liquid crystal phase, low viscosity, and properly large Δn, while satisfying general characteristics required for the liquid crystal composition of the AM-LCD, is presented.

The composition comprises at least one compound selected from the group of compounds expressed by formulae (1-1), (1-2) and (1-3) as a first component, and comprises at least one compound selected from the group of compounds expressed by formulae (2-1), (2-2), (2-3), (2-4), (2-5), and (2-6) as a second component.

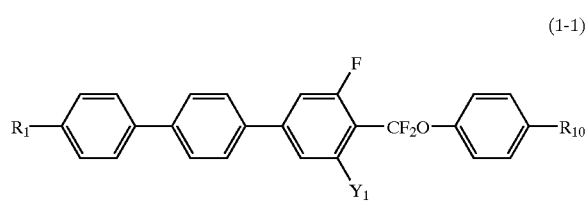

(1-1)

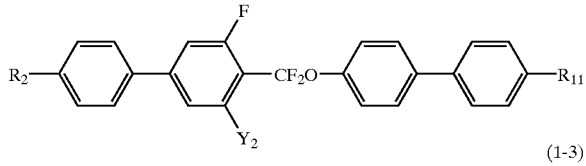

(1-2)

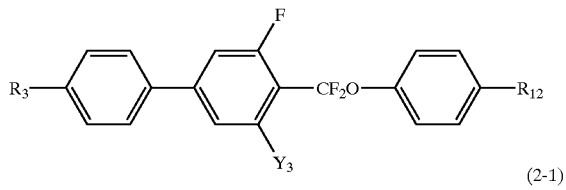

(1-3)

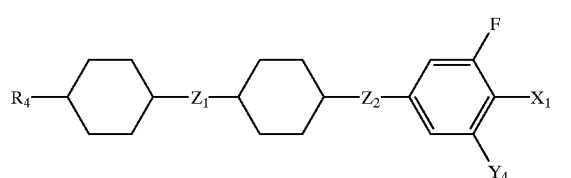

(2-1)

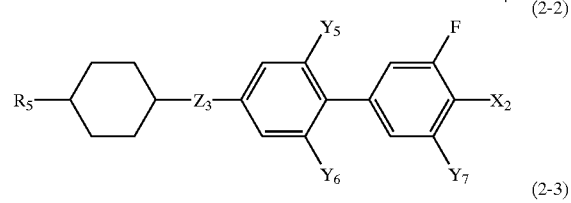

(2-2), (2-3)

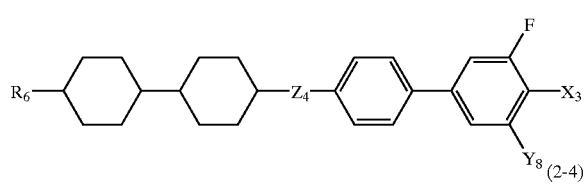

(2-4)

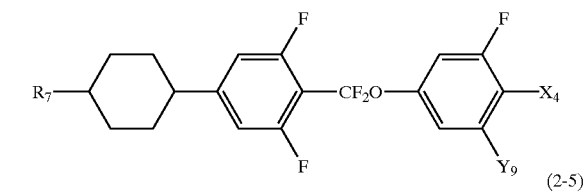

(2-5)

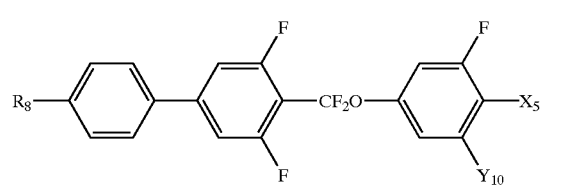

(2-6)

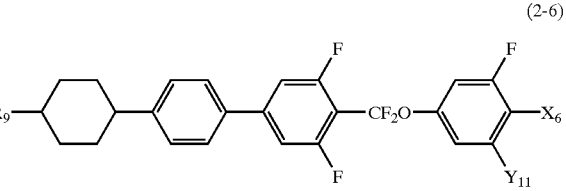

8 Claims, No Drawings

U.S. PATENT DOCUMENTS 6,325,949 B1 * 12/2001 Takeshita et al. ...... 252/299.63
6,335,064 B1 *  1/2002 Tomi et al. .................. 428/1.1

FOREIGN PATENT DOCUMENTS

| | | |
|---|---|---|
| EP | 0 786 509 | 7/1997 |
| EP | 0 832 955 | 4/1998 |
| EP | 1 046 693 | 10/2000 |
| GB | 2 229 438 | 9/1990 |
| JP | 5-112778 | 5/1993 |
| JP | 10-251186 | 9/1998 |

* cited by examiner

LIQUID CRYSTAL COMPOSITION AND LIQUID CRYSTAL DISPLAY DEVICE

TECHNICAL FIELD

The present invention relates to a nematic liquid crystal composition and, more specifically, relates to a liquid crystal composition for active matrix (AM) mode and to a liquid crystal display device (LCD) using the liquid crystal composition.

BACKGROUND ART

An active matrix mode-liquid crystal display devices (AM-LCD) is attracting a great deal of attention as the likely winner among LCD's as it enable to display with extreme precision, and is applied for displays such as monitors, note-type personal computers, digital still cameras and digital video cameras. Characteristics required for the liquid crystal composition of AM-LCD are shown in the items (1) to (5) below.

(1) A liquid crystal composition should show a nematic phase in the range of temperature as wide as possible in order to widen the usable temperature range of the liquid crystal display devices (elevating the upper temperature limit of a nematic phase as high as possible, and lowering the lower temperature limit of a nematic phase as low as possible).

(2) Viscosity of the liquid crystal composition should be as low as possible in order to accelerate the response speed of the liquid crystal display device.

(3) Optical anisotropy ($\Delta n$) of the liquid crystal composition should be able to have a proper value depending on the cell thickness (d) in order to enhance the contrast of the liquid crystal display device.

(4) Values of specific resistivity (specific resistance) on the liquid crystal composition should be increased and the voltage holding ratio of the cell containing the liquid crystal composition should be large, in order to enhance the contrast of the liquid crystal display device. The voltage holding ratio should be large especially at a high temperature region.

(5) Threshold voltage of the liquid crystal composition should be lowered in order to downsize the battery which is the power source to drive liquid crystal display device.

Recently it has been requested keenly to apply for an animation in the LCD and various LCD display modes have been studied. The addressing mode of the AM-LCD employs TN display mode in which the orientation of liquid crystal molecules between the upper and lower substrates is twisted by 900°. In the TN display mode, it is necessary to keep the product, $\Delta n \cdot d$, of optical anisotropy ($\Delta n$) of a liquid crystal material to be filled in a cell and cell thickness (d $\mu$m) at a certain value (for example $\Delta n \cdot d = 0.5$ etc.) in order to obtain an optimum contrast and to avoid coloration by the interference of the liquid crystal cell when no voltage is applied, as reported by G.Bauer (Cryst. Liq., 63, 45 (1981)). Therefore, if the liquid crystal material having large $\Delta n$ is used, the value of d can be decreased. Response speed ($\tau$) is proportional to viscosity ($\eta$) of the liquid crystal material and to d squared, as proposed by E. Jakeman et al. (Phys. Lett., A, 39 (1972) 69). When the liquid crystal material having large $\Delta n$ is used, the thickness of cell constituting liquid crystal display device can be decreased, and thus $\tau$ can be increased. As such, the liquid crystal composition having large $\Delta n$ and low viscosity is very useful for the liquid crystal display devices.

Also the development of the display intended for outdoor use has been requested with the increase of a portable type display. For being bearable in the outdoor use, materials are requested to have a nematic phase over the wide range of temperature exceeding the temperature range-of environment in use. To widen a nematic phase range of the liquid crystal composition, it is necessary to use liquid crystal compounds having a high clearing point and good miscibility with other liquid crystal compounds. Generally, a compound having a high clearing point, namely having many six member-rings in the chemical structure may be used for elevating the clearing point. However, miscibility at a low temperature region may tend to be a problem in such case.

It is also requested the liquid crystal composition with high reliability such as a high voltage holding ratio (V.H.R.) or large specific resistivity in order to keep a high contrast especially in the AM-LCD.

Based on the background described above, the specification of WO 96/11897 discloses a novel liquid crystal compound having large dielectric anisotropy ($\Delta n$) together with extremely low viscosity and disclosed a liquid crystal composition comprising the compound for low voltage driving in various modes such as a AM mode or a super twisted nematic mode (STN mode). JP 10-251186 A describes a compound similar to the compound of formula (1-3) in the present invention as the compound having large $\Delta \epsilon$ and small temperature dependence.

The liquid crystal composition for the AM-LCD disclosed in WO 96/11897 described above (the composition does not contain compounds having cyano in the terminal, and compounds having cyano can not be used for the liquid crystal composition of the AM-LCD because of its low voltage holding ratio) has drawbacks that the V.H.R. is low and optical anisotropy is low as is shown in the Comparative Example of the present invention.

JP 10-251186 A discloses a composition using the compound similar to that of formulae (1-1) to (1-3) of the present invention, however, the similar compound has large and positive $\Delta \epsilon$. When such compound is used, viscosity of the composition is increased. Then, the compound has a drawback of low response speed in the LCD. The similar compound has a drawback that $\Delta n$ is small and that a high voltage holding ratio required for the composition of TFT can not be attained by the combination of a cyano compound.

Although liquid crystal compositions were studied, the liquid crystal composition for AM-LCD has been required especially to keep a high voltage holding ratio at a high temperature region in order to enhance the contrast of the liquid crystal display device, to have a wide range of a liquid crystal phase in order to have a wide addressing temperature range, and to have low viscosity in order to accelerate response speed, while maintaining the characteristics (1) to (5) described above. Enlarging $\Delta n$ has also been requested by the requirement being smaller cell gap.

The liquid crystal composition has been always required to be improved though enthusiastic efforts are made for various purposes.

DISCLOSURE OF THE INVENTION

The object of the present invention is to provide a liquid crystal composition especially having a high voltage holding ratio at a high temperature region in order to enhance the contrast of a liquid crystal display device, having a wide range of a liquid crystal phase which means a high clearing point and good miscibility at low temperature, having low viscosity in order to accelerate response speed of the liquid crystal display device, and having properly large Δn in order to enhance the contrast in the liquid crystal display device, while satisfying general characteristics required for the liquid crystal composition of the AM-LCD.

The present inventors have made enthusiastic efforts to achieve the above object, have found the liquid crystal composition described below can achieve the purpose of the present invention, and have completed the present invention.

The liquid crystal composition of the present invention is described in the items 1 to 4 below.

1. A liquid crystal composition characterized by comprising at least one compound selected from the group of compounds expressed by formulae (1-1), (1-2) and (1-3) as a first component and comprising at least one compound selected from the group of compounds expressed by formulae (2-1), (2-2), (2-3), (2-4), (2-5), and (2-6) as a second component.

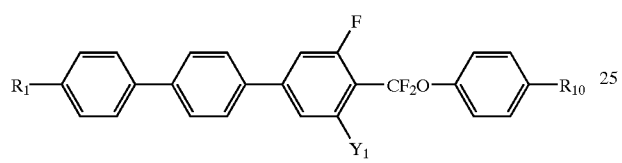
(1-1)

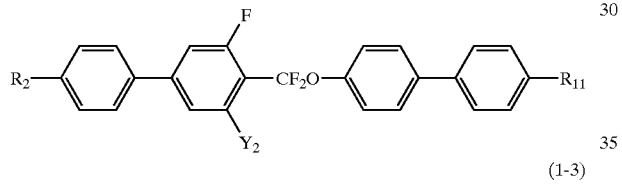
(1-2)

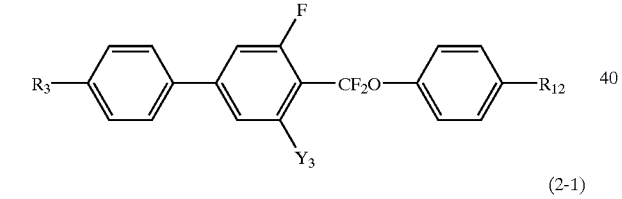
(1-3)

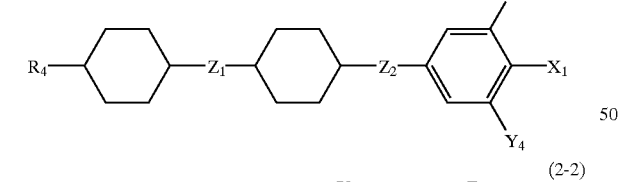
(2-1)

(2-2)

(2-3)

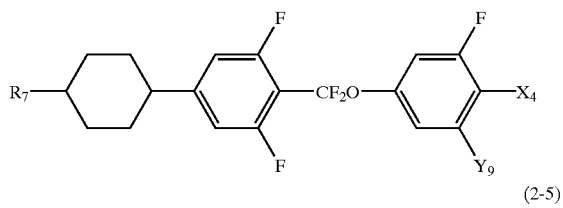
(2-4)

(2-5)

(2-6)

wherein $R_1$ to $R_9$ each independently represents alkyl or alkoxy having 1 to 10 carbon, alkenyl or alkoxymethyl having 2 to 10 carbon; $R_{10}$ to $R_{12}$ each independently represents alkyl or alkoxy having 1 to 10 carbon, alkenyl or alkoxymethyl having 2 to 10 carbon, F, Cl, $CF_3$, $OCF_3$, or $OCF_2H$; $X_1$ to $X_6$ each independently represents F, $CF_3$, $OCF_3$, $OCF_2H$ or Cl; $Y_1$ to $Y_{11}$ each independently represents H or F; $Z_1$ to $Z_4$ each independently represents a single bond or —$C_2H_4$—.

2. The liquid crystal composition described in the item 1 described above characterized by comprising 3 to 45% by weight of the first component, and comprising 25 to 97% by weight of a second component each based on the total weight of the liquid crystal composition.

3. A liquid crystal composition comprising at least one compound selected from the group of compounds expressed by formulae (1-1) to (1-3) as a first component, comprising at least one compound selected from the group of compounds expressed by formulae (2-1) to (2-6) as a second component, and comprising at least one compound selected from the group of compounds expressed by formula (3) as a third component

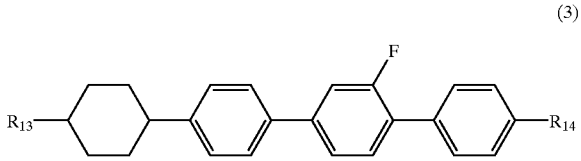
(3)

wherein $R_{13}$ and $R_{14}$ each independently represents alkyl having 1 to 10 carbon.

4. The liquid crystal composition in the item 3 described above characterized by comprising 3 to 45% by weight of the first component, comprising 25 to 97% by weight of the second component, and comprising 25% and less by weight of the third component each based on the total weight of the liquid crystal composition.

The liquid crystal display device of the present invention is described in the item 5 below.

5. The liquid crystal display device composed by using the liquid crystal composition in any one of the items 1 to 4 described above.

Followings are explanation of preferable embodiments of compounds constituting the liquid crystal composition of the present invention.

Among the compounds expressed by formula (1-1) as the first component of the liquid crystal composition of the present invention, the compounds expressed by formulae (1-1-1) to (1-1-12) in the following are preferably used. In these formulae, R and R' each independently represents alkyl or alkoxy having 1 to 10 carbon, or alkoxymethyl or alkenyl having 2 to 10 carbon.

(1-1-1)

(1-1-2)

(1-1-3)

(1-1-4)

(1-1-5)

(1-1-6)

(1-1-7)

(1-1-8) 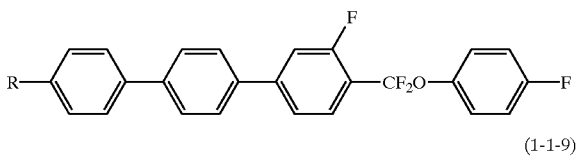

(1-1-9) 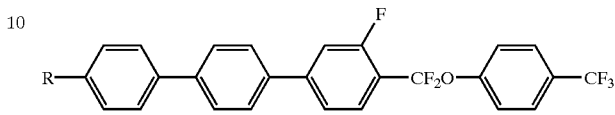

(1-1-10)

(1-1-11)

(1-1-12)

Among the compounds expressed by formula (1-2) as the first component of the liquid crystal composition of the present invention, the compounds expressed by formulae (1-2-1) to (1-2-12) in the following are preferably used. In these formulae, R and R' each independently represents alkyl or alkoxy having 1 to 10 carbon, or alkoxymethyl or alkenyl having 2 to 10 carbon.

(1-2-1)

(1-2-2)

(1-2-3)

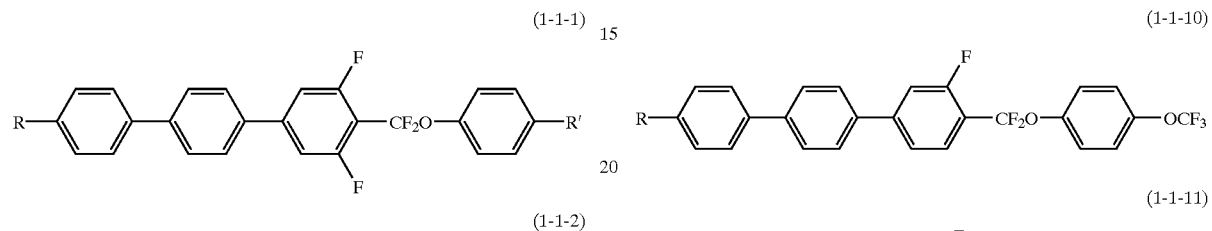
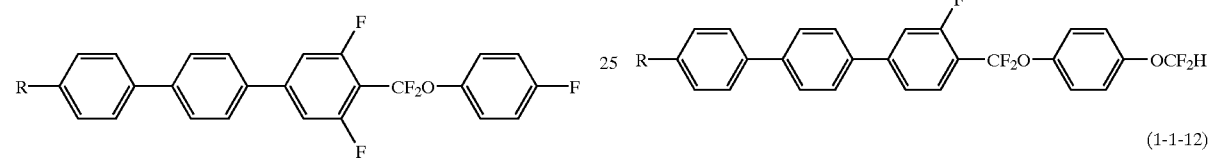
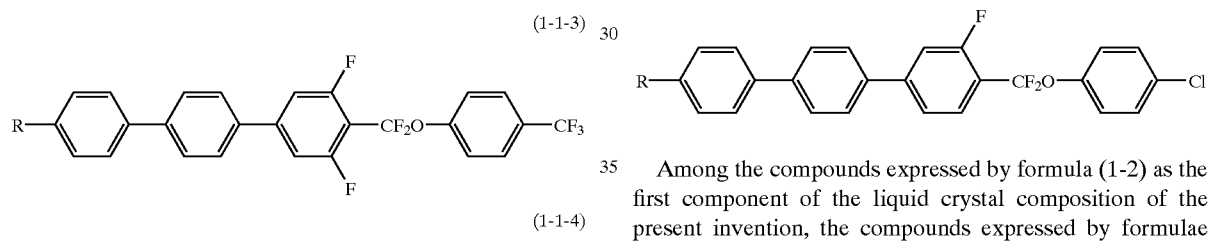
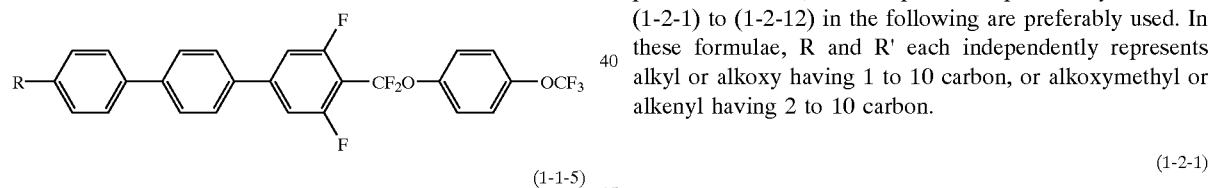
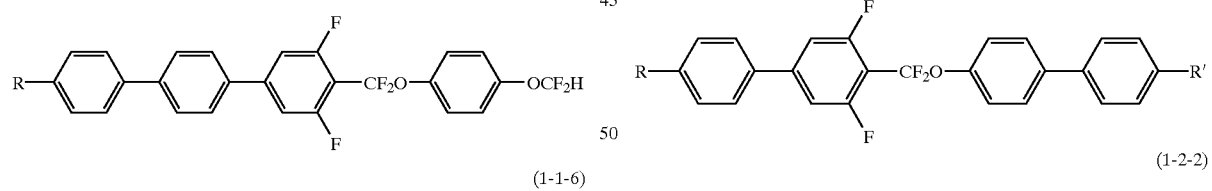
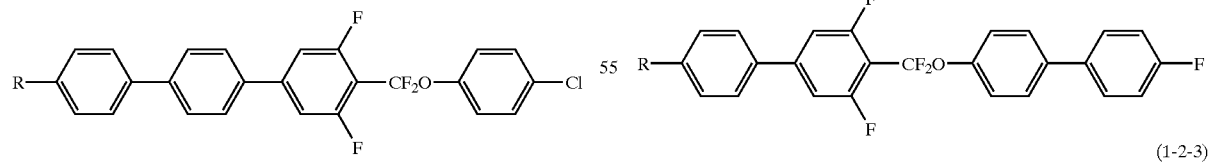
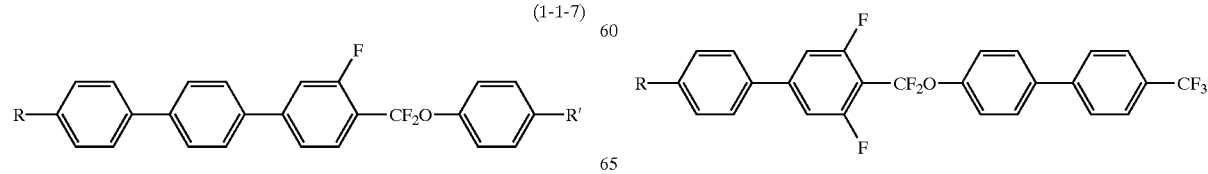

-continued
(1-2-4)
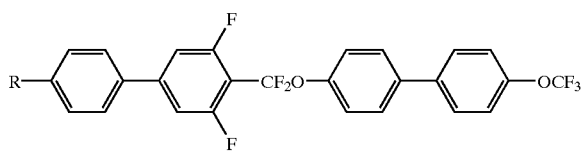
(1-2-5)
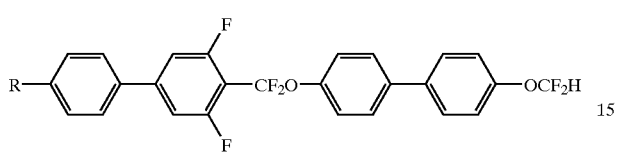
(1-2-6)
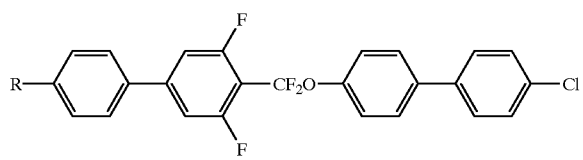
(1-2-7)
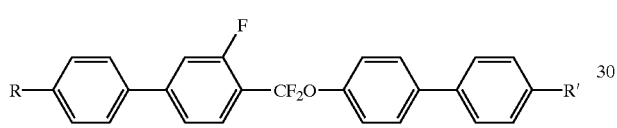
(1-2-8)
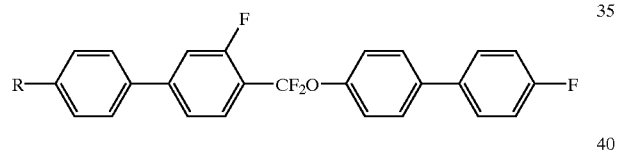
(1-2-9)
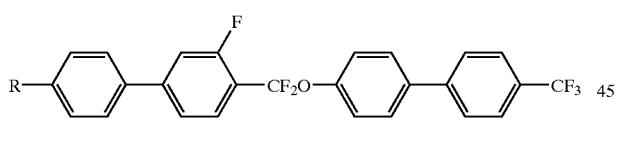
(1-2-10)
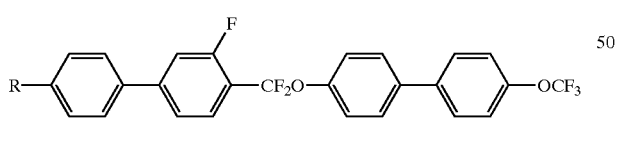
(1-2-11)
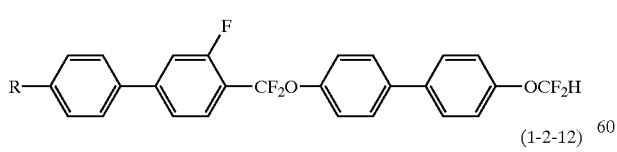
(1-2-12)
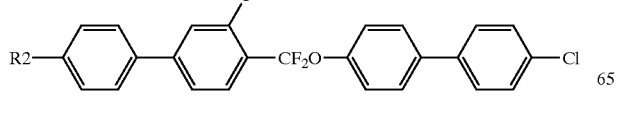
Among the compounds expressed by formula (1-3) as the first component of the liquid crystal composition of the present invention, the compounds expressed by formulae (1-3-1) to (1-3-12) in the following are preferably used. In these formulae, R and R' each independently represents alkyl or alkoxy having 1 to 10 carbon, or alkoxymethyl or alkenyl having 2 to 10 carbon.
(1-3-1)
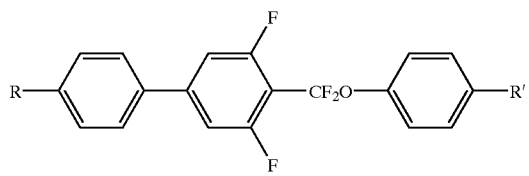
(1-3-2)
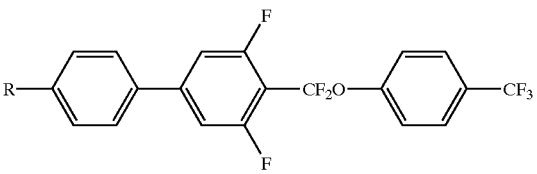
(1-3-3)
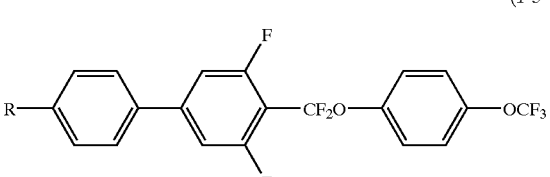
(1-3-4)
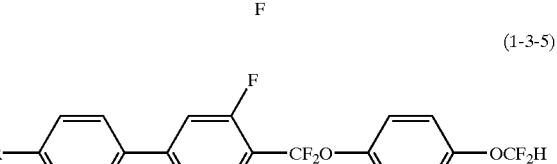
(1-3-5)
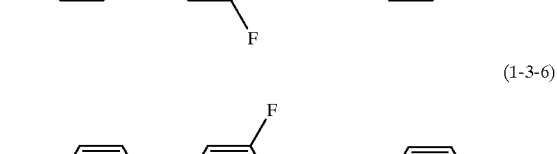
(1-3-6)
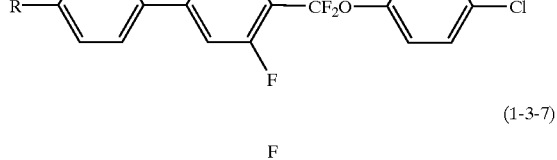
(1-3-7)
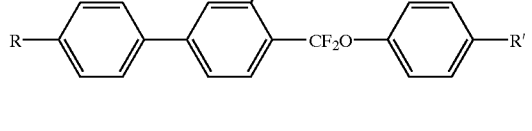

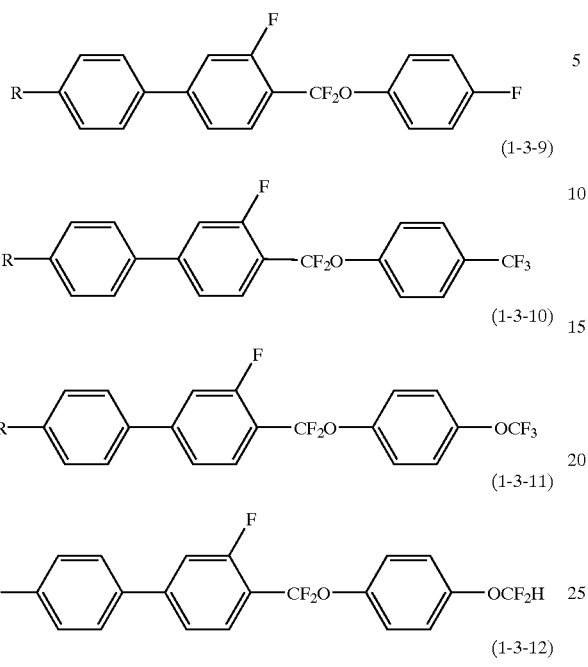
Among the compounds expressed by formula (2-1) as the second component of the liquid crystal composition of the present invention, the compounds expressed by formulae (2-1-1) to (2-1-30) in the following are preferably used. In these formulae, each R independently represents alkyl or alkoxy having 1 to 10 carbon, or alkoxymethyl or alkenyl having 2 to 10 carbon.
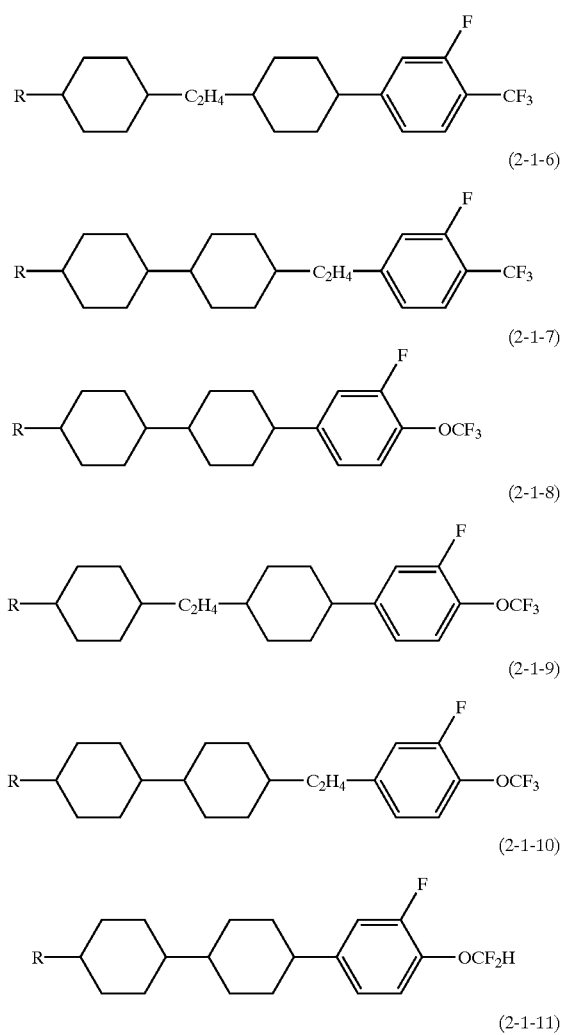
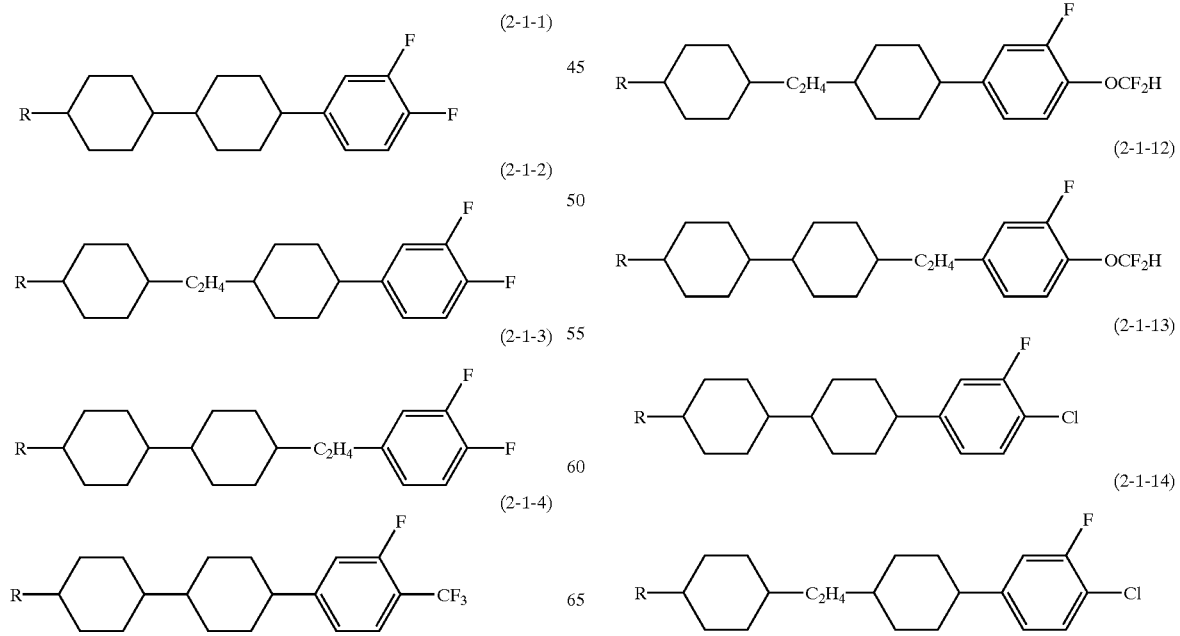

(2-1-15)
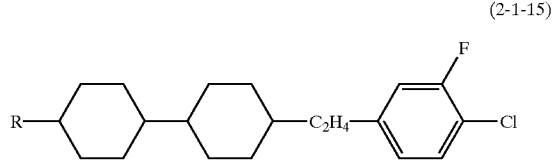
(2-1-16)
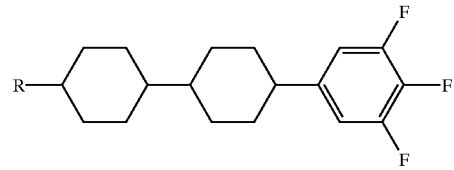
(2-1-17)
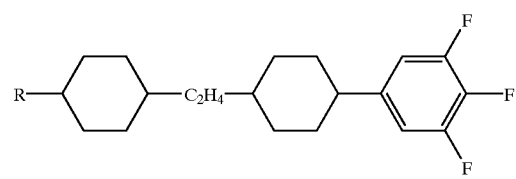
(2-1-18)
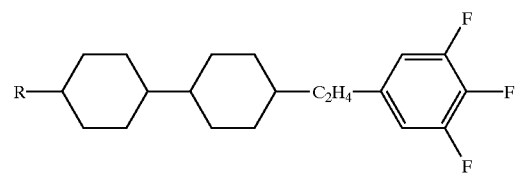
(2-1-19)
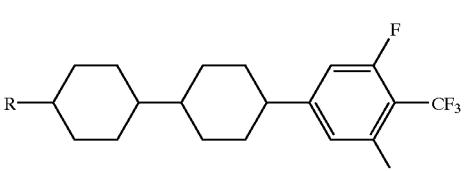
(2-1-20)
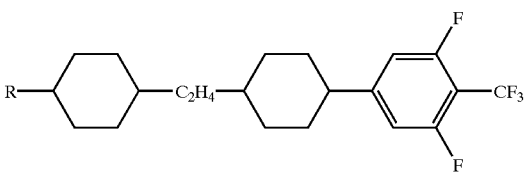
(2-1-21)
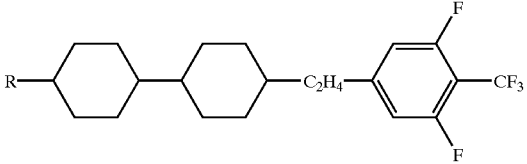
(2-1-22)
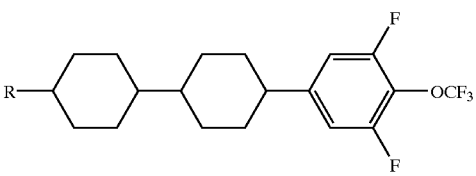
(2-1-23)
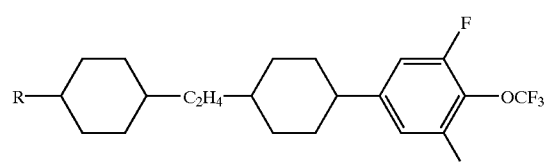
(2-1-24)
(2-1-25)
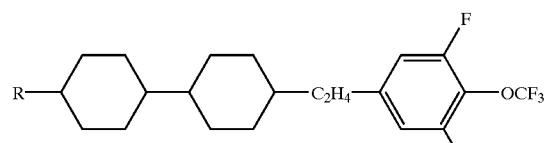
(2-1-26)
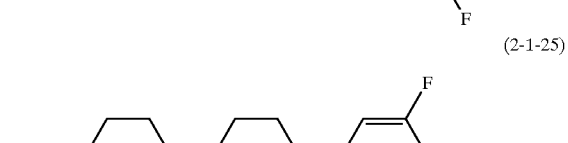
(2-1-27)
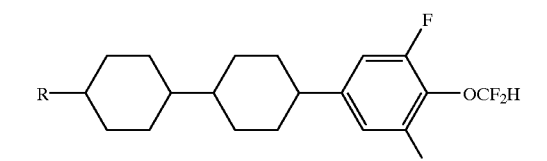
(2-1-28)
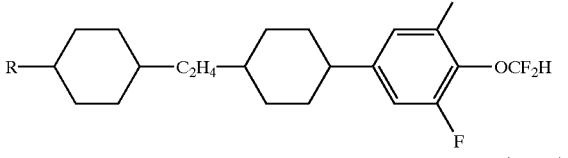
(2-1-29)
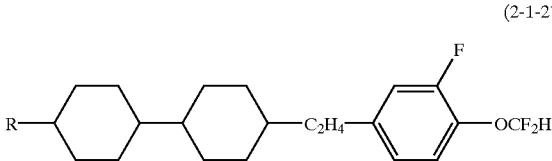
(2-1-30)
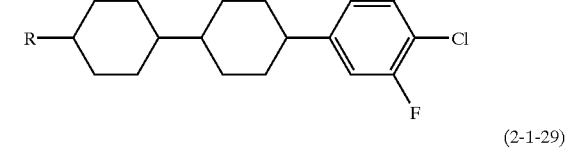

Among the compounds expressed by formula (2-2) as the second component of the liquid crystal composition of the present invention, the compounds expressed by formulae (2-2-1) to (2-2-40) in the following are preferably used. In these formulae, each R independently represents alkyl or alkoxy having 1 to 10 carbon, or alkoxymethyl or alkenyl having 2 to 10 carbon.
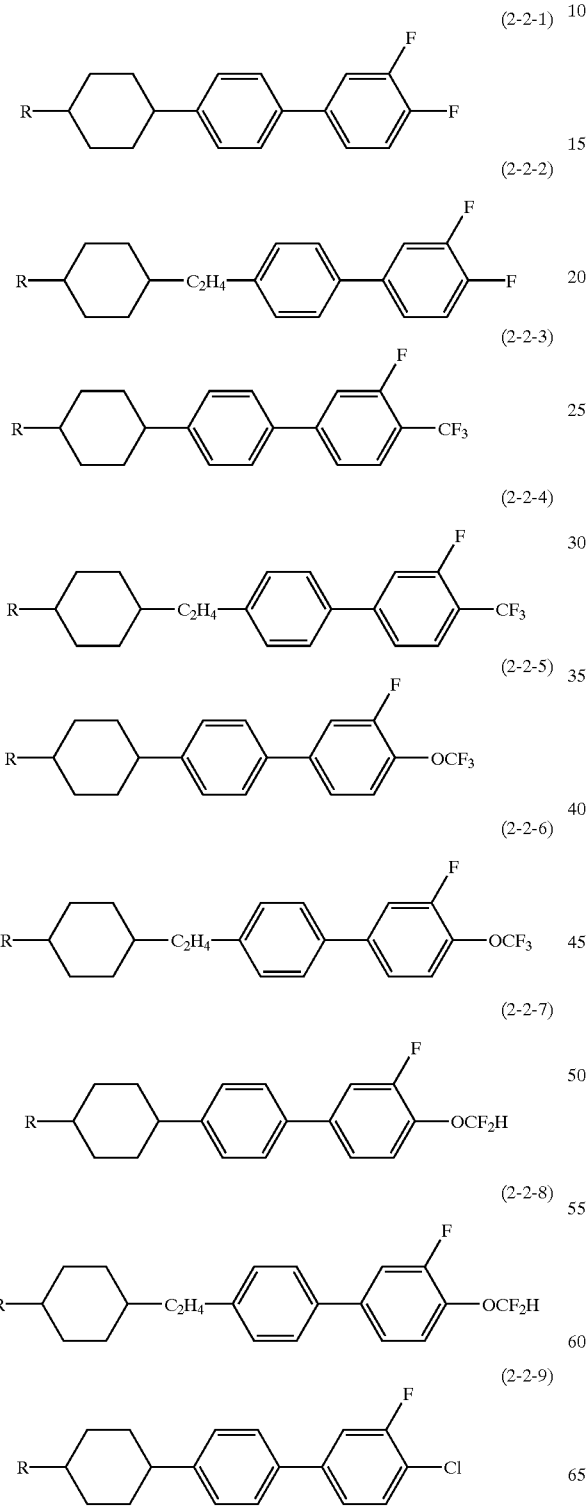
(2-2-1)
(2-2-2)
(2-2-3)
(2-2-4)
(2-2-5)
(2-2-6)
(2-2-7)
(2-2-8)
(2-2-9)
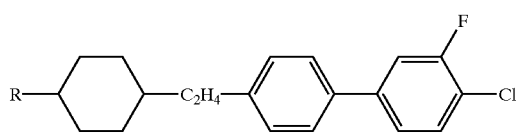
(2-2-10)
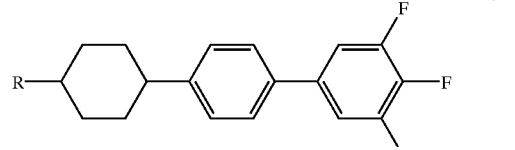
(2-2-11)
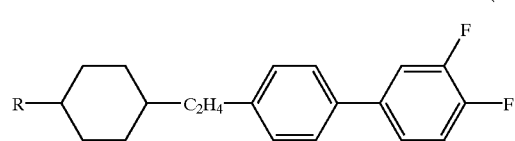
(2-2-12)
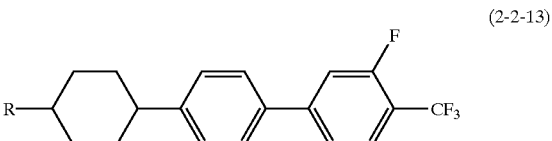
(2-2-13)
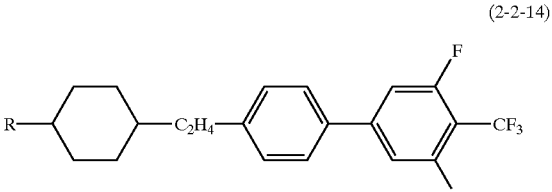
(2-2-14)
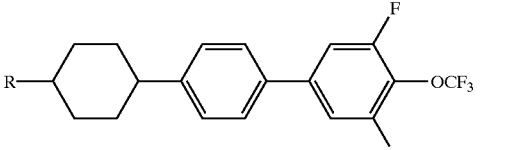
(2-2-15)
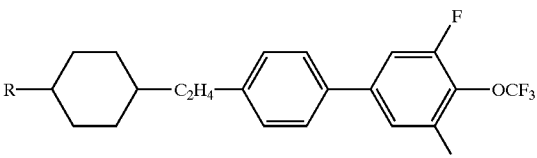
(2-2-16)
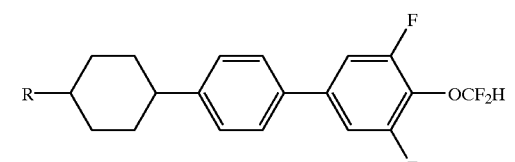
(2-2-17)

(2-2-18)
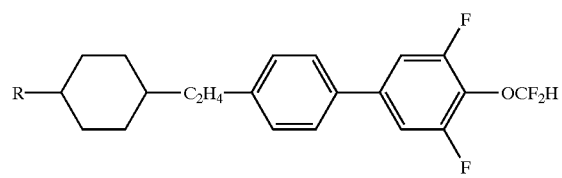
(2-2-19)
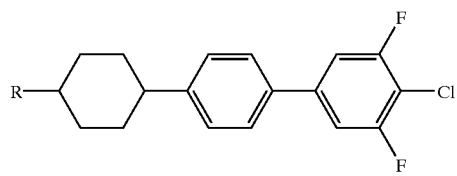
(2-2-20)
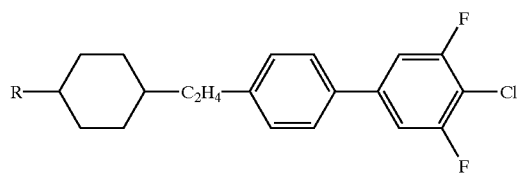
(2-2-21)
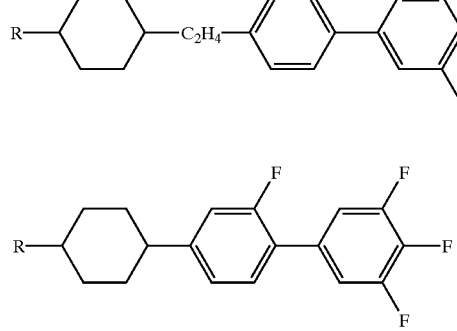
(2-2-22)
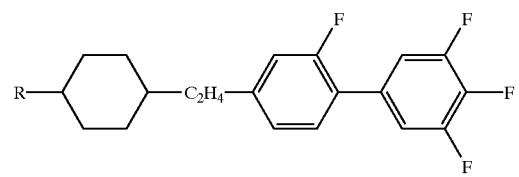
(2-2-23)
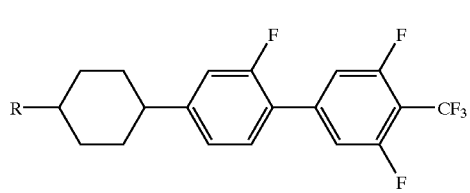
(2-2-24)
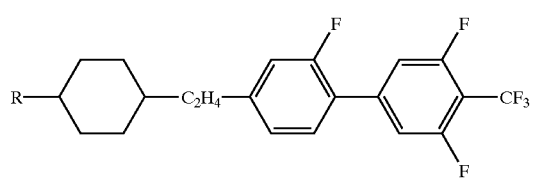
(2-2-25)
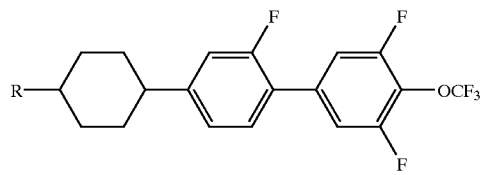
(2-2-26)
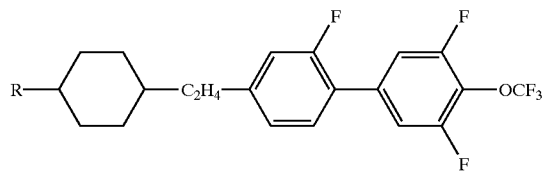
(2-2-27)
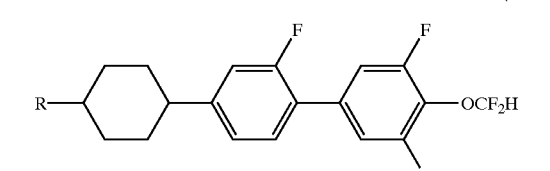
(2-2-28)
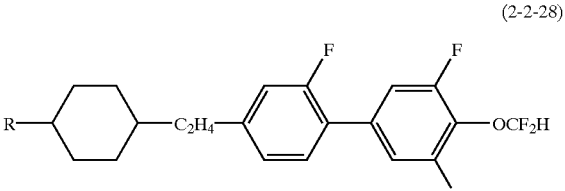
(2-2-29)
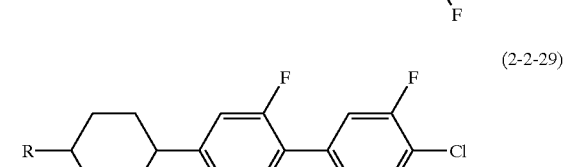
(2-2-30)
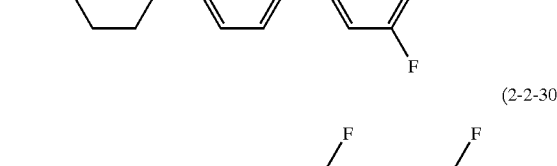
(2-2-31)
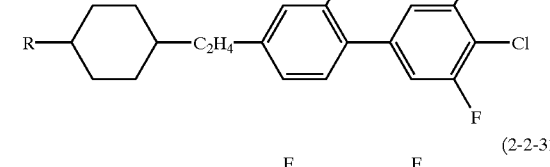
(2-2-32)
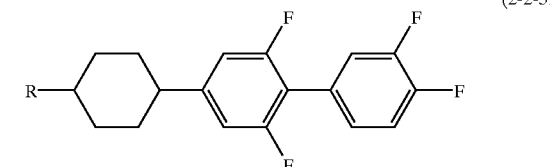
(2-2-33)
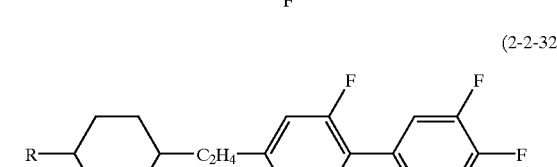

Among the compounds expressed by formula (2-3) as the second component of the liquid crystal composition of the present invention, the compounds expressed by formulae (2-3-1) to (2-3-20) are preferably used. In these formulae, each R independently represents alkyl or alkoxy having 1 to 10 carbon, or alkoxymethyl or alkenyl having 2 to 10 carbon.

(2-3-11)
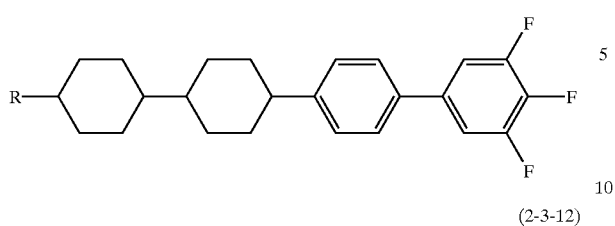
(2-3-12)
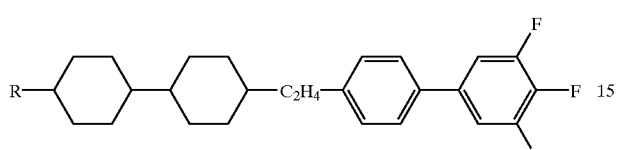
(2-3-13)
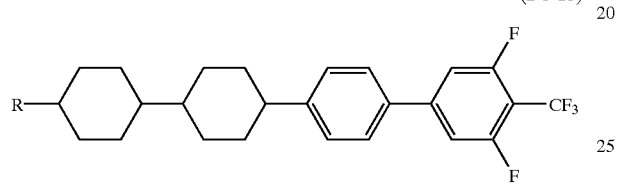
(2-3-14)
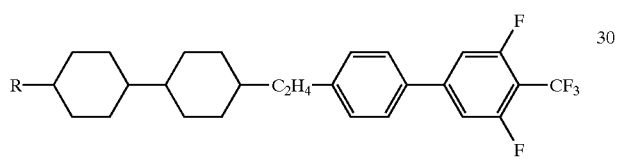
(2-3-15)
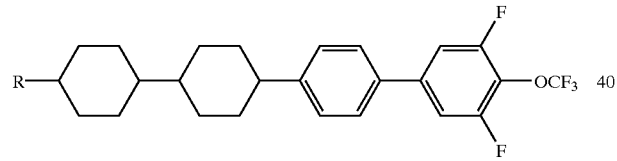
(2-3-16)
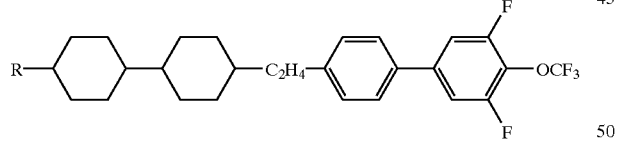
(2-3-17)
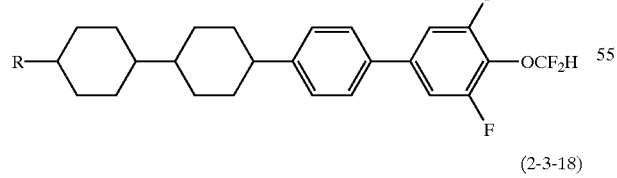
(2-3-18)
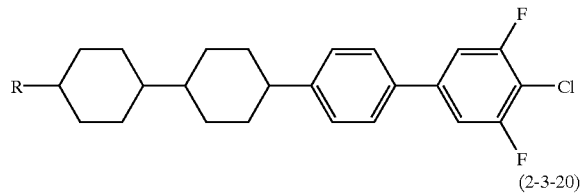
(2-3-19)
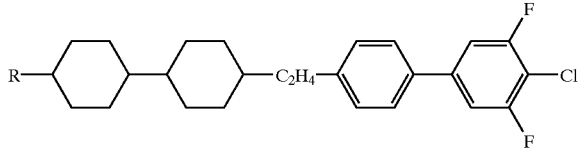
(2-3-20)
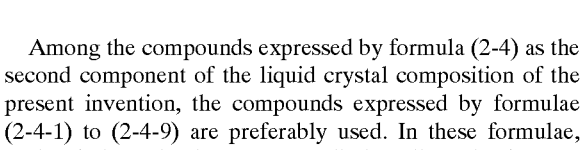
Among the compounds expressed by formula (2-4) as the second component of the liquid crystal composition of the present invention, the compounds expressed by formulae (2-4-1) to (2-4-9) are preferably used. In these formulae, each R independently represents alkyl or alkoxy having 1 to 10 carbon, or alkoxymethyl or alkenyl having 2 to 10 carbon.
(2-4-1)
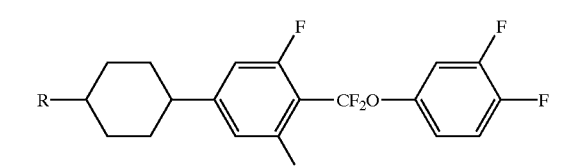
(2-4-2)
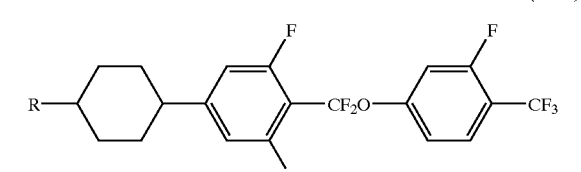
(2-4-3)
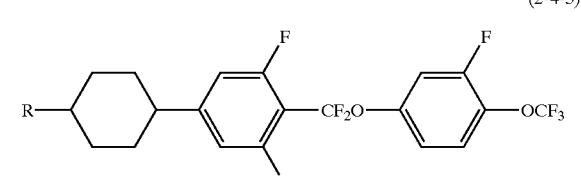
(2-4-4)
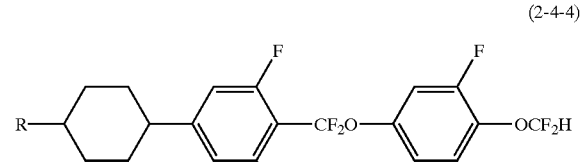
(2-4-5)
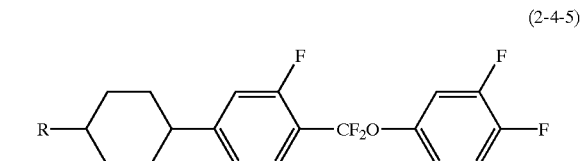

(2-4-6)
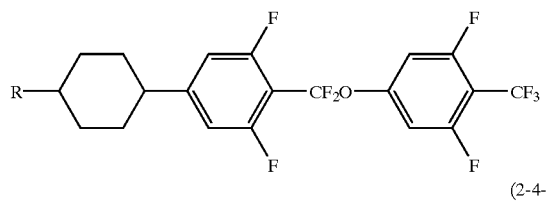

(2-4-7)
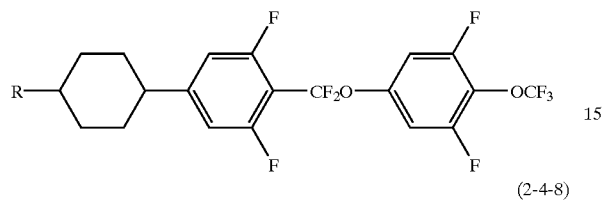

(2-4-8)
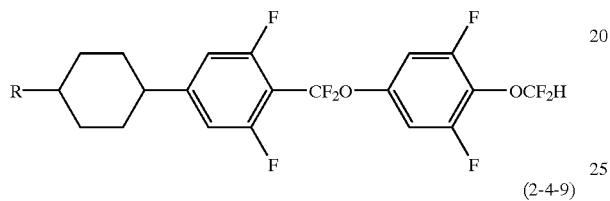

(2-4-9)
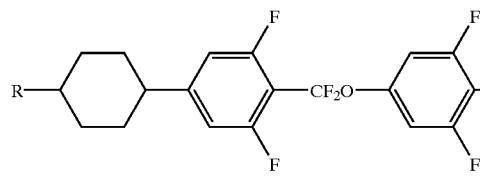

Among the compounds expressed by formula (2-5) as the second component of the liquid crystal composition of the present invention, the compounds expressed by formulae (2-5-1) to (2-5-9) in the following are preferably used. In these formulae, each R independently represents alkyl or alkoxy having 1 to 10 carbon, or alkoxymethyl or alkenyl having 2 to 10 carbon.

(2-5-1)

(2-5-2)

(2-5-3)

(2-5-4)
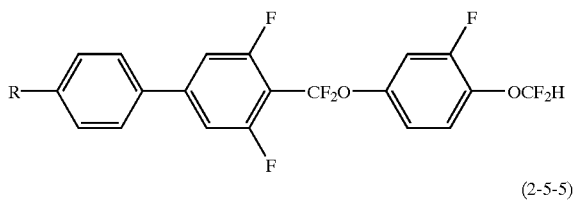

(2-5-5)
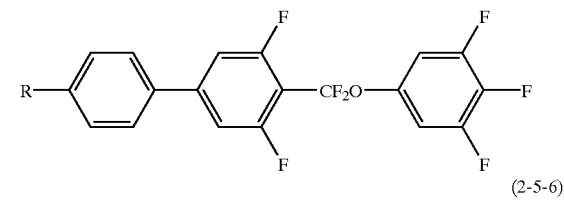

(2-5-6)
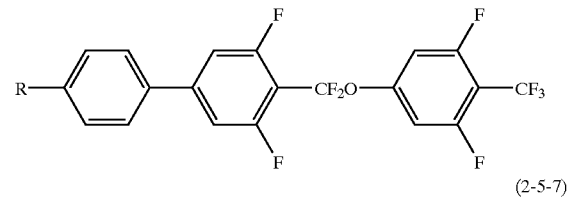

(2-5-7)
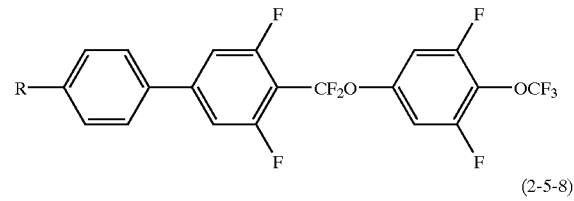

(2-5-8)
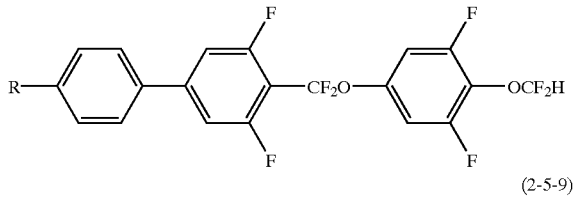

(2-5-9)
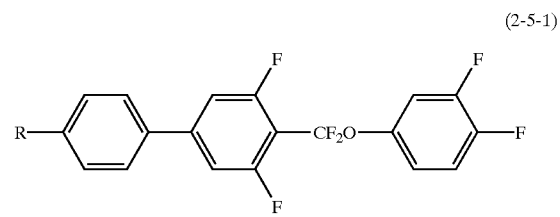

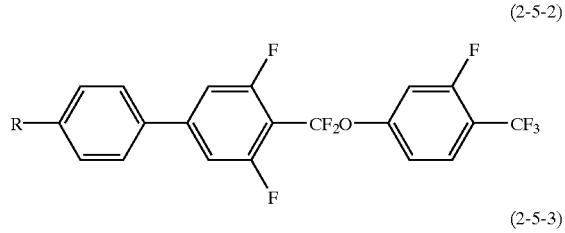

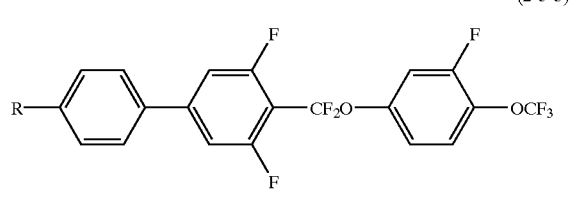

Among the compounds expressed by formula (2-6) as the second component of the liquid crystal composition of the present invention, the compounds expressed by formulae (2-6-1) to (2-6-9) are preferably used. In these formulae, each R independently represents alkyl or alkoxy having 1 to 10 carbon, or alkoxymethyl or alkenyl having 2 to 10 carbon.

(2-6-1)
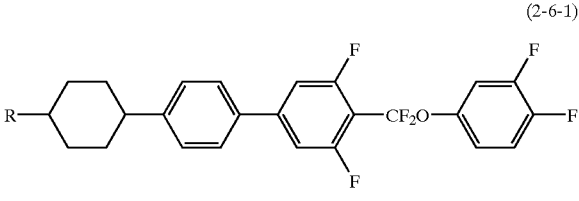

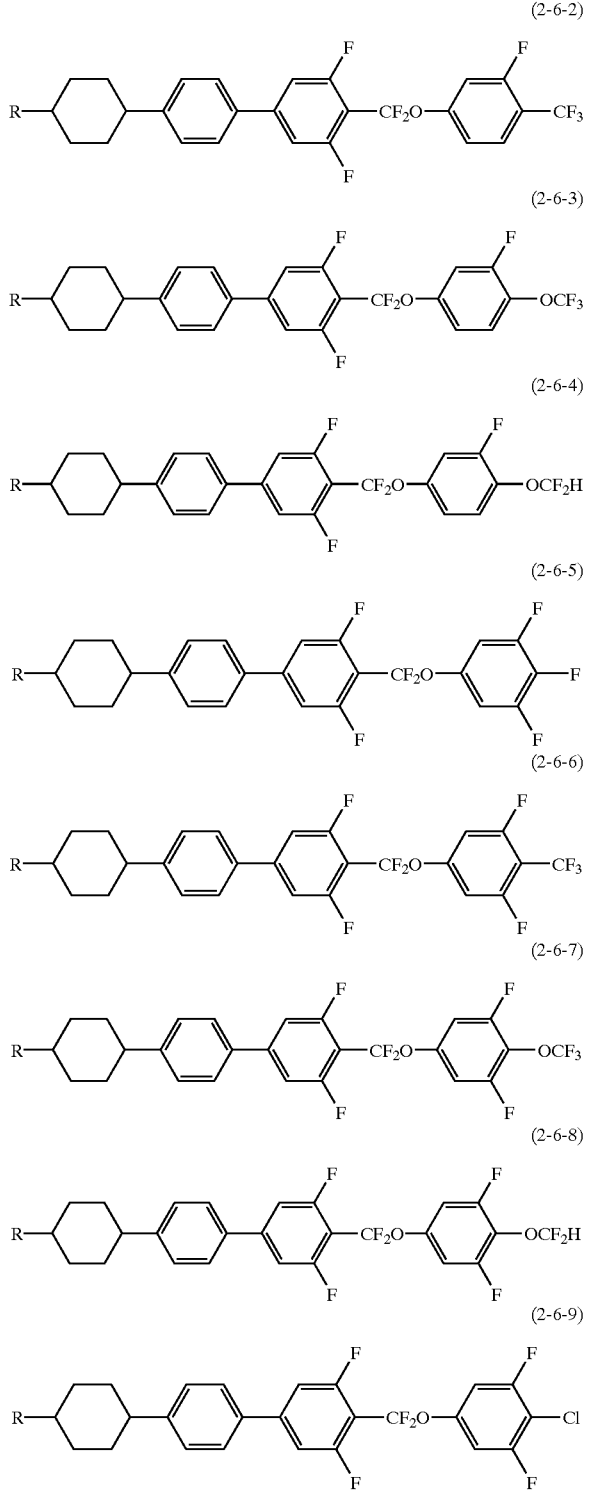

this reason, the compounds expressed by formulae (1-1) to (1-3) of the present invention are used for the purpose to enlarge Δn, to minimize η, and to adjust threshold voltage, while maintaining a high voltage holding ratio of the liquid crystal composition at a high temperature region. As the compounds expressed by formulae (1-1) and (1-2) have four rings and have very high $T_{NI}$ (the upper temperature limit of a liquid crystal phase) being 100° C. to 180° C., the liquid crystal compositions having a high $T_{NI}$ can be prepared by the use of these four ring-compounds.

The compounds expressed by formulae (2-1) to (2-6), which are the second component of the present invention, have features of large Δn being about 0.03 to 0.18, of large Δε being about 6 to 32, and of a large value of specific resistivity. For this reason, the compounds expressed by formulae (2-1) to (2-6) of the present invention are used for the purpose to keep large Δn, to widen a range of a liquid crystal phase, and to adjust threshold voltage lower, while maintaining a high voltage holding ratio of the liquid crystal composition at a high temperature region.

For further detailed explanation, the compounds expressed by formula (2-1), which are the second component of the present invention, have three rings and have Δn being about 0.03 to 0.10 and a large Δε value being about 6 to 13. They also have features of relatively small η and high specific resistivity. For this reason, the compounds expressed by formula (2-1) of the present invention are used for the purpose to decrease η, and especially to adjust threshold voltage and Δn, while maintaining a high voltage holding ratio of the liquid crystal composition at a high temperature region.

The compounds expressed by formula (2-2), which are the second component of the present invention, have three rings and have relatively large Δn being about 0.10 to 0.14 and a large value of Δε being about 9 to 18. They also have features of relatively small η and high specific resistivity. For this reason, the compounds expressed by formula (2-2) of the present invention are used for the purpose to minimize η, to keep Δn relatively large, and especially to adjust threshold voltage being small, while maintaining a high voltage holding ratio of liquid crystal composition at a high temperature region.

The compounds expressed by formula (2-3), which are the second component of the present invention, have four rings and have extremely a high $T_{NI}$ (the upper temperature limit of a liquid crystal phase) of 180° C. or higher. They also have relatively large Δn being about 0.13 to 0.16 and relatively large Δε being about 10 to 14. Further they have features of relatively small η and high specific resistivity. For this reason, the compounds expressed by formula (2-3) of the present invention are used for the purpose to elevate the upper temperature limit of a liquid crystal phase of the liquid crystal composition, to keep Δn relatively large, and especially to adjust threshold voltage, while maintaining a high voltage holding ratio of the liquid crystal composition at a high temperature region.

The compounds expressed by formula (2-4), which are the second component of the present invention, have three rings and have considerably large Δε being 15 to 32 and Δn being about 0.05 to 0.09. They also have features of a large value of specific resistivity. For this reason, the compounds expressed by formula (2-4) of the present invention are used especially to reduce threshold voltage, while maintaining a high voltage holding ratio of the liquid crystal composition at a high temperature region.

The compounds expressed by formula (2-5), which are the second component of the present invention, have three Followings are explanation on the role of compounds constituting the liquid crystal composition of the present invention.

The compounds expressed by formulae (1-1) to (1-3), which are the first component of the liquid crystal composition of the present invention, has features of a very large Δn being about 0.13 to 0.25, of relatively small η being 20 to 60 mPa·s compared with other three or four ring-compounds, and of a large value of specific resistivity. For rings and have considerably large Δε of about 15 to 32 and relatively a large value of Δn being about 0.1 to 0.15. They also have features of high specific resistivity. For this reason, the compounds expressed by formula (2-5) of the present invention are used especially to enlarge Δn and to reduce threshold voltage, while maintaining a high voltage holding ratio of the liquid crystal composition at a high temperature region.

The compounds expressed by formula (2-6), which are the second component of the present invention, have four rings and have extremely high $T_{NI}$ being about 100° C. to 130° C., considerably large Δε being about 15 to 30 and relatively a large value of Δn being about 0.14 to 0.18. They also they have features of a large value of specific resistivity. For this reason, the compounds expressed by formula (2-6) of the present invention are used to elevate the upper temperature limit of a liquid crystal phase, and especially to enlarge Δn and to reduce threshold voltage, while maintaining a high voltage holding ratio of the liquid crystal composition at a high temperature region.

The compounds expressed by formula (3), which are the third component of the present invention, have features of Δε being close to 0, of a large value of specific resistivity, of extremely large Δn of 0.2 or more which is extremely large, and of a high upper temperature limit of a nematic phase being 250° C. or more. For this reason, the compounds expressed by formula (3) of the present invention are used for the purpose to elevate the upper temperature limit of a nematic phase, to adjust threshold voltage, and to enlarge Δn considerably, while maintaining a high voltage holding ratio of the liquid crystal composition at a high temperature region.

Summarizing the above, the liquid crystal composition of the present invention has features widening the range of a liquid crystal phase, especially minimizing η and enlarging Δn, while keeping a high upper temperature limit of the liquid crystal phase of the liquid crystal composition based on the first component, and further adjusting the range of the liquid crystal phase, Δn, and threshold voltage based on the second component.

Followings are explanation on preferable ratios in the contents of components which constitute the liquid crystal composition of the present invention.

The content of the first component in the liquid crystal composition of the present invention is preferably 3 to 45% by weight and the content of the second component therein is preferably 25 to 97% by weight each based on the total weight of the liquid crystal composition.

For further detailed explanation, the compounds expressed by formulae (1-1) to (1-3) are desirable to be mixed into the composition as much as possible to enlarge Δn and to minimize η. However, they may elevate the lower temperature limit of a nematic phase of the liquid crystal composition if they are contained too much in the composition. For this reason, the compounds expressed by formulae (1-1) to (1-3), which are the first component of the present invention, are preferably 45% by weight and less based on the total weight of the liquid crystal composition. The ratio of the first component of the present invention in the liquid crystal composition is preferably 3% or more by weight to enlarge Δn, to widen the range of a liquid crystal phase, and to minimize η, while maintaining a high voltage holding ratio of the liquid crystal composition at a high temperature region.

The compounds expressed by formulae (2-1) to (2-6), which are the second component of the present invention, may lower the upper temperature limit of a nematic phase of the liquid crystal composition, increase η, and lower Δn, when they are contained in the composition in large quantities. For this reason, the ratio of the compounds expressed by formulae (2-1) to (2-6), which are the second component of the present invention, is preferably 97% and less by weight based on the total weight of the liquid crystal composition. The ratio of the second component in the liquid crystal composition is preferably 25% or more by weight to keep low threshold voltage and to lower the lower temperature limit of a nematic phase, while maintaining a high voltage holding ratio of the liquid crystal composition at a high temperature region.

The compounds expressed by formula (3), which are the third component of the present invention, may elevate the lower temperature limit of a nematic phase of the liquid crystal composition and may increase the threshold voltage because their Δε are close to 0, when they are contained in the composition in large quantities. For this reason, the ratio of compounds expressed by formula (3) of the present invention is preferably 25% and less by weight based on the total weight of the liquid crystal composition.

The method of the preparation on the compounds expressed by formula (1-3) of the present invention, for example, that on the compounds expressed by formula (1-3-2) is described in JP 10-251186 A. On the compounds expressed by formulae (2-1), (2-2) and (2-3), for example, those expressed by formulae (2-1-16), (2-2-11) and (2-3-12), the method of their preparation is described in JP 2-233626 A. On the compounds expressed by formulae (2-4), (2-5) and (2-6) of the present invention, for example, those expressed by formulae (2-4-5), (2-5-5) and (2-6-5), the method of their preparation is described JP 10-251186 A. On the compounds expressed by formula (3), the method of their preparation is described in JP 2-237949 A. Then, each compound constituting the composition of the present invention can be prepared based on prior arts.

To the liquid crystal composition of the present invention, liquid crystal compounds other than those expressed by formulae described above can be mixed in the amount not affecting the object of the present invention. The liquid crystal composition used in the present invention can be prepared by the conventional methods. In general, the method is that various compounds are mixed and dissolved each other at a high temperature. To the liquid crystal composition of the present invention, chiral doping agents such as cholesteryl nonanoate (CN) or CM-43L expressed by the following formula may be added in order to adjust to the required twist angle by inducing the spiral structure to liquid crystal molecules.

CM-43L:

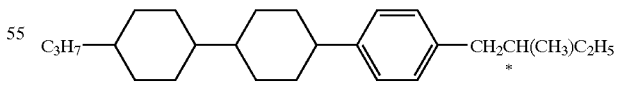

The liquid crystal composition of the present invention can also be used for a guest-host mode by adding dichroic dyes such as phthalocyanine type, styril type, azo type, azomethine type, azoxy type, quinophthalone type, anthraquinone type and tetrazine type. It can also be used for a polymer-dispersed type liquid crystal display device, a birefringence control mode or a dynamic scattering mode. It can also be used for in-plane switching mode. Further, it is preferable for OCB mode utilizing its large Δn.

EXAMPLE

The present invention will be explained in detail by Examples. However, it is not restricted to Examples shown below. All ratios of components shown in Comparative Examples and Examples are indicated with a percentage by weight. The compounds used in Comparative Examples and Examples are designated by symbols according to the definition shown in Table 1.

TABLE 1

Notation of Compounds Using Symbols
R-(A$_1$)-Z$_1$- . . . -Z$_n$-(A$_n$)-X

| 1) Left terminal group R- | Symbol |
|---|---|
| C$_n$H$_{2n+1}$— | n- |
| C$_n$H$_{2n+1}$O— | nO— |
| C$_n$H$_{2n+1}$OC$_m$H$_{2m}$— | nOm- |
| CH$_2$=CH— | V— |
| CH$_2$=CHC$_n$H$_{2n}$— | Vn- |
| C$_n$H$_{2n+1}$CH=CHC$_m$H$_{2m}$— | nVm- |
| C$_n$H$_{2n+1}$CH=CHC$_m$H$_{2m}$CH=CHC$_k$H$_{2k}$— | nVmVk- |

| 2) Ring structure -(A$_1$)-,-(A$_2$)- | Symbol |
|---|---|
| 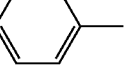 | B |
| 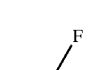 | B(F) |
| 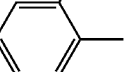 | B(F,F) |
| 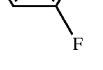 | H |
| 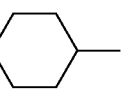 | G |

| 3) Bonding group -Z$_1$-, -Z$_2$- | Symbol |
|---|---|
| —CH$_2$CH$_2$— | 2 |
| —COO— | E |
| —O≡C— | T |
| —CH=CH— | V |
| —CF$_2$O— | CF2O |

| 4) Right terminal group -X | Symbol |
|---|---|
| —F | —F |
| —Cl | —CL |
| —CF$_3$ | —CF3 |
| —OCF$_3$ | —OCF3 |
| —OCF$_2$H | —OCF2H |
| —C$_n$H$_{2n+1}$ | -n |
| —OC$_n$H$_{2n+1}$ | —On |
| —COOCH$_3$ | —EMe |

TABLE 1-continued

Notation of Compounds Using Symbols
R-(A$_1$)-Z$_1$- . . . -Z$_n$-(A$_n$)-X

5) Notation example

Example 1  3-H2B(F,F)B(F)—F

Example 2  3-HB(F)TB-2

Example 3  3-HB(F,F)CF2OB(F,F)—F

Characteristics of the liquid crystal composition are designated as T$_{NI}$ for the upper temperature limit of a nematic liquid crystal phase, T$_C$ for the lower temperature limit of a nematic liquid crystal phase, η for viscosity, Δn for optical anisotropy, Vth for threshold voltage, VHR(25) for a voltage holding ratio at 25° C. and VHR(100) for a voltage holding ratio at 100° C.

T$_{NI}$ was obtained by measuring the transitional temperature from a nematic phase to an isotropic phase-liquid in the course of rising temperature, using a polarization microscope.

T$_C$ was judged based on a liquid crystal phase after keeping samples of a liquid crystal composition for 30 days in freezers at 10° C., 0° C., −10° C., −20° C., −30° C., and −40° C. For example, T$_C$ of a liquid crystal composition was expressed as <−20° C. when the liquid crystal composition maintained a nematic state at −20° C. and it changed to be crystals or a smectic state at −30° C. η was measured at 20° C. Δ n was measured at 25° C. using a light source having wave length of 589 nm. Vth was measured at 25° C. Vth was defined as the value of applied voltage when the transmittance of light reached 90% after passing through the cell which had cell gap of (0.5/Δn) μm and a twist angle of 80°, and was applied with a rectangular wave of 32 Hz frequency in normally white mode. A voltage holding ratio was obtained by an area method.

Comparative Example 1

A liquid crystal composition disclosed in Example 32 of JP 10-251186 A was prepared.

| | |
|---|---|
| 3-B(F)CF2OBB(F,F)-F | 5% |
| 3-HB(F)CF2OBB(F,F)-F | 5% |
| 3-HBBCF2OB(F,F)-F | 5% |
| 2-HHB(F)-F | 17% |
| 3-HHB(F)-F | 17% |
| 5-HHB(F)-F | 6% |
| 2-H2HB(F)-F | 10% |
| 3-H2HB(F)-F | 5% |
| 5-H2HB(F)-F | 10% |
| 2-HBB(F)-F | 6% |
| 3-HBB(F)-F | 6% |
| 5-HBB(F)-F | 3% |

The above composition had the following characteristics.

| | | |
|---|---|---|
| $T_{NI}$ | = | 94.2° C. |
| $T_C$ | < | −20° C. |
| $\eta$ | = | 29.4 mPa · s |
| $\Delta n$ | = | 0.094 |
| Vth | = | 1.72 V |
| VHR(25) | = | 98.5% |
| VHR(100) | = | 95.2% |

This composition has a drawback of small $\Delta n$ though it has a high V.H.R. at a high temperature.

Comparative Example 2

A composition disclosed in Example 44 of JP 10-251186 A was prepared.

| | |
|---|---|
| 3-B(F)CF2OBB(F,F)-F | 5% |
| 3-HB(F)CF2OBB(F,F)-CF3 | 3% |
| 3-HB(F)CF2OBB(F,F)-F | 4% |
| 3-H2HB(F,F)-F | 7% |
| 5-H2HB(F,F)-F | 8% |
| 3-HHB(F,F)-F | 10% |
| 4-HHB(F,F)-F | 5% |
| 3-HH2B(F,F)-F | 9% |
| 3-HBB(F,F)-F | 15% |
| 5-HBB(F,F)-F | 15% |
| 3-HBEB(F,F)-F | 2% |
| 4-HBEB(F,F)-F | 2% |
| 5-HBEB(F,F)-F | 2% |
| 3-HHEB(F,F)-F | 10% |
| 4-HHEB(F,F)-F | 3% |

The above composition had the following characteristics.

| | | |
|---|---|---|
| $T_{NI}$ | = | 77.1° C. |
| $T_C$ | < | −20° C. |
| $\eta$ | = | 35.7 mPa · s |
| $\Delta n$ | = | 0.099 |
| Vth | = | 1.45 V |
| VHR(25) | = | 98.0% |
| VHR(100) | = | 94.0% |

This composition has a drawback of small $\Delta n$, low $T_{NI}$ and a low V.H.R. at a high temperature.

Comparative Example 3

A composition disclosed in Example 36 of WO 96/11897 was prepared.

| | |
|---|---|
| 3-HBCF2OB(F,F)-F | 5% |
| 5-HBCF2OB(F,F)-F | 10% |
| 5-HBCF2OB-CF3 | 5% |
| 5-HBCF2OB(F)-F | 5% |
| 3-HBCF2OB-OCF3 | 5% |
| 7-HB(F,F)-F | 8% |
| 3-HHB(F,F)-F | 6% |
| 4-HHB(F,F)-F | 3% |
| 3-H2HB(F,F)-F | 10% |
| 4-H2HB(F,F)-F | 6% |
| 5-H2HB(F,F)-F | 6% |
| 3-HH2B(F,F)-F | 10% |
| 5-HH2B(F,F)-F | 5% |
| 3-HBB(F,F)-F | 5% |
| 5-HBB(F,F)-F | 5% |
| 3-HHBB(F,F)-F | 3% |
| 3-HH2BB(F,F)-F | 3% |

The above composition had the following characteristics.

| | | |
|---|---|---|
| $T_{NI}$ | = | 61.8° C. |
| $T_C$ | < | −20° C. |
| $\eta$ | = | 23.6 mPa · s |
| $\Delta n$ | = | 0.083 |
| Vth | = | 1.50 V |
| VHR(25) | = | 98.7% |
| VHR(100) | = | 95.6% |

This composition has a drawback of small $\Delta n$ and a low $T_{NI}$ though it has low viscosity and a high V.H.R. at a high temperature.

Example 1

The $CF_2O$ compounds in Comparative Example 1 were replaced by the compounds expressed by formula (1-2) of the present invention.

As a first component,

| | |
|---|---|
| 2-BB(F,F)CF2OBB-3 | 5% |
| 2-BB(F,F)CF2OBB-5 | 5% |
| 3-BB(F,F)CF2OBB-3 | 5% |
| 3-BB(F,F)CF2OBB-5 | 5% |

As a second component,

| | |
|---|---|
| 2-HHB(F)-F | 17% |
| 3-HHB(F)-F | 17% |
| 5-HHB(F)-F | 6% |
| 2-H2HB(F)-F | 10% |
| 3-H2HB(F)-F | 5% |
| 5-H2HB(F)-F | 10% |
| 2-HBB(F)-F | 6% |
| 3-HBB(F)-F | 6% |
| 5-HBB(F)-F | 3% |

The above composition had the following characteristics.

| | | |
|---|---|---|
| $T_{NI}$ | = | 108.0° C. |
| $T_C$ | < | −20° C. |
| $\eta$ | = | 27.8 mPa · s |
| $\Delta n$ | = | 0.112 |

-continued

| | | |
|---|---|---|
| Vth | = | 2.02 V |
| VHR(25) | = | 99.0% |
| VHR(100) | = | 96.6% |

This composition has a wider range of a liquid crystal phase, lower η, larger Δn and a higher V.H.R. compared to that of Comparative Example 1.

Example 2

The $CF_2O$ compounds in Comparative Example 2 were replaced by the compounds expressed by formula (1-1) of the present invention.

As a first component,

| | |
|---|---|
| 2-BBB (F,F) CF2OB-3 | 5% |
| 3-BBB (F,F) CF2OB-3 | 3% |
| 3-BBB (F,F) CF2OB-5 | 4% |

As a second component,

| | |
|---|---|
| 3-H2HB (F,F)-F | 7% |
| 5-H2HB (F,F)-F | 8% |
| 3-HHB (F,F)-F | 10% |
| 4-HHB (F,F)-F | 5% |
| 3-HH2B (F,F)-F | 9% |
| 3-HBB (F,F)-F | 15% |
| 5-HBB (F,F)-F | 15% |

As the other component,

| | |
|---|---|
| 3-HBEB (F,F)-F | 2% |
| 4-HBEB (F,F)-F | 2% |
| 5-HBEB (F,F)-F | 2% |
| 3-HHEB (F,F)-F | 10% |
| 4-HHEB (F,F)-F | 3% |

The above composition had the following characteristics.

| | | |
|---|---|---|
| $T_{NI}$ | = | 86.6° C. |
| $T_c$ | < | −20° C. |
| η | = | 32.3 mPa.s |
| Δn | = | 0.109 |
| Vth | = | 1.48 V |
| VHR (25) | = | 98.0% |
| VHR (100) | = | 94.4% |

This composition has a wider range of a liquid crystal phase, lower η, larger Δn, and a higher V.H.R. compared to that of Comparative Example 2.

Example 3

The $CF_2O$ compounds in Comparative Example 3 were replaced by the compounds expressed by formula (1-2) of the present invention.

As a first component,

| | |
|---|---|
| 2-BB (F,F) CF2OBB-3 | 10% |
| 3-BB (F,F) CF2OBB-3 | 10% |
| 3-BB (F,F) CF2OBB-OCF3 | 5% |
| 3-BB (F,F) CF2OBB-CF3 | 5% |

As a second component,

| | |
|---|---|
| 3-HHB (F,F)-F | 6% |
| 4-HHB (F,F)-F | 3% |
| 3-H2HB (F,F)-F | 10% |
| 4-H2HB (F,F)-F | 6% |
| 5-H2HB (F,F)-F | 6% |
| 3-HH2B (F,F)-F | 10% |
| 5-HH2B (F,F)-F | 5% |
| 3-HBB (F,F)-F | 5% |
| 5-HBB (F,F)-F | 5% |
| 3-HHBB (F,F)-F | 3% |
| 3-HH2BB (F,F)-F | 3% |

As the other component,

| | |
|---|---|
| 7-HB (F,F)-F | 8% |

The above composition had the following characteristics.

| | | |
|---|---|---|
| $T_{NI}$ | = | 87.7° C. |
| $T_c$ | < | −20° C. |
| η | = | 34.2 mPa.s |
| Δn | = | 0.120 |
| Vth | = | 1.45 V |
| VHR (25) | = | 98.8% |
| VHR (100) | = | 96.2% |

This composition has a wider range of a liquid crystal phase, low η in spite of its high $T_{NI}$, larger Δn and a higher V.H.R. compared to that of Comparative Example 3.

Example 4

As a first component,

| | |
|---|---|
| 3-BB (F,F) CF2CBB-F | 5% |
| 5-BB (F,F) CF2OBB-F | 5% |
| 3-BB (F,F) CF2OB-F | 5% |
| 2-BB (F,F) CF2OB-3 | 15% |
| 3-BB (F,F) CF2OB-3 | 15% |

As a second component,

| | |
|---|---|
| 3-H2HB (F,F)-F | 5% |
| 3-HBB (F,F)-F | 10% |
| 5-HBB (F,F)-F | 10% |
| 3-H2BB (F,F)-F | 6% |
| 3-HHBB (F,F)-F | 8% |
| 3-HH2BB (F,F)-F | 6% |
| 3-BB (F,F) CF2OB (F,F)-F | 10% |

The above composition had the following characteristics.

| | |
|---|---|
| $T_{NI}$ = | 66.9° C. |
| $T_C$ < | −30° C. |
| η = | 35.6 mPa · s |
| Δn = | 0.143 |
| Vth = | 1.43 V |
| VHR(25) = | 98.7% |
| VHR(100) = | 96.4% |

This composition has a wide range of a liquid crystal phase, low η, large Δn, and a high V.H.R.

Example 5

As a first component,

| | |
|---|---|
| 3-BBB(F,F)CF2OB-F | 5% |

As a second component,

| | |
|---|---|
| 3-HHB(F,F)-F | 10% |
| 3-H2HB(F,F)-F | 9% |
| 3-HBB(F,F)-F | 7% |
| 5-HBB(F,F)-F | 8% |
| 3-HHBB(F,F)-F | 6% |
| 3-HH2BB(F,F)-F | 4% |
| 3-BB(F,F)CF2OB(F,F)-F | 20% |
| 5-BB(F,F)CF2OB(F,F)-F | 15% |

As the other component,

| | |
|---|---|
| 3-HH-4 | 3% |
| 3-HHB-1 | 6% |
| 101-HBBH-3 | 7% |

The above composition had the following characteristics.

| | |
|---|---|
| $T_{NI}$ = | 84.6° C. |
| $T_C$ < | −30° C. |
| η = | 32.2 mPa · s |
| Δn = | 0.124 |
| Vth = | 1.30 V |
| VHR(25) = | 98.8% |
| VHR(100) = | 96.0% |

This composition has a wide range of a liquid crystale phase, low η, large Δn, and high V.H.R.

Example 6

As a first component,

| | |
|---|---|
| 3-BB(F,F)CF2OBB-3 | 5% |

As a second component,

| | |
|---|---|
| 2-HBB(F)-F | 7.5% |
| 3-HBB(F)-F | 7.5% |

-continued

| | |
|---|---|
| 5-HBB(F)-F | 15% |
| 3-HBB(F,F)-F | 13% |
| 5-HBB(F,F)-F | 13% |
| 3-HBB(F,F)CF2OB(F,F)-F | 11% |
| 5-HBB(F,F)CF2OB(F,F)-F | 11% |

As a third component,

| | |
|---|---|
| 5-HBB(F)B-2 | 9% |
| 5-HBB(F)B-3 | 8% |

The above composition had the following characteristics.

| | |
|---|---|
| $T_{NI}$ = | 133.4° C. |
| $T_C$ < | −20° C. |
| η = | 43.9 mPa · s |
| Δn = | 0.170 |
| Vth = | 1.59 V |
| VHR(25) = | 99.1% |
| VHR(100) = | 96.8% |

This composition has wide range of a liquid crystal phase, low η, large Δn, and a high V.H.R.

Example 7

As a first component,

| | |
|---|---|
| 3-BBB(F,F)CF2OB-OCF3 | 3% |
| 3-BB(F,F)CF2OB-3 | 5% |
| 5-BB(F,F)CF2OB-3 | 10% |

As a second component,

| | |
|---|---|
| 2-HBB(F)-F | 7.5% |
| 3-HBB(F)-F | 7.5% |
| 5-HBB(F)-F | 15% |
| 3-HBB(F,F)-F | 6% |
| 2-HHBB(F,F)-F | 4% |
| 3-HHBB(F,F)-F | 4% |
| 4-HHBB(F,F)-F | 4% |
| 3-BB(F,F)CF2OB(F,F)-F | 11% |
| 5-BB(F,F)CF2OB(F,F)-F | 11% |

As a third component,

| | |
|---|---|
| 5-HBB(F)B-2 | 6% |
| 5-HBB(F)B-3 | 6% |

The above composition had the following characteristics.

| | |
|---|---|
| $T_{NI}$ = | 100.9° C. |
| $T_C$ < | −20° C. |
| η = | 40.2 mPa · s |
| Δn = | 0.164 |
| Vth = | 1.44 V |

-continued

| | |
|---|---|
| VHR(25) = | 98.7% |
| VHR(100) = | 96.5% |

This composition has a wide range of a liquid crystal phase, low η, large Δn, and a high V.H.R.

Example 8

As a first component,

| | |
|---|---|
| 3-BBB(F,F)CF2OB-F | 3% |

As a second component,

| | |
|---|---|
| 2-HBB(F)-F | 7.5% |
| 3-HBB(F)-F | 7.5% |
| 5-HBB(F)-F | 15% |
| 3-HBB(F,F)-F | 15% |
| 5-HBB(F,F)-F | 15% |
| 3-H2BB(F,F)-F | 8% |
| 2-HHBB(F,F)-F | 5% |
| 3-HHBB(F,F)-F | 5% |
| 4-HHBB(F,F)-F | 5% |
| 2-HBB(F,F)CF2OB(F,F)-F | 7% |
| 3-HBB(F,F)CF2OB(F,F)-F | 7% |

The above composition had the following characteristics.

| | |
|---|---|
| $T_{NI}$ = | 101.8° C. |
| $T_C$ < | −20° C. |
| η = | 43.6 mPa · s |
| Δn = | 0.142 |
| Vth = | 1.47 V |
| VHR(25) = | 99.1% |
| VHR(100) = | 96.5% |

This composition has a wide range of a liquid crystal phase, low η, large Δn, and a high V.H.R.

Example 9

As a first component,

| | |
|---|---|
| 3-BBB(F,F)CF2OB-F | 5% |
| 5-BBB(F,F)CF2OB-F | 3% |
| 2-BBB(F,F)CF2OB-3 | 6% |
| 3-BBB(F,F)CF2OB-3 | 6% |
| 3-BBB(F)CF2OB-CL | 2% |
| 3-BB(F,F)CF2OB-F | 4% |
| 5-BB(F,F)CF2OB-F | 4% |
| 2-BB(F,F)CF2OB-3 | 5% |
| 3-BB(F,F)CF2OB-3 | 5% |

As a second component,

| | |
|---|---|
| 3-HHBB(F,F)-F | 7% |
| 3-BB(F,F)CF2OB(F,F)-F | 20% |

As the other component,

| | |
|---|---|
| 3-HB-O2 | 8% |
| 3-HH-4 | 2% |
| 7-HB-CL | 3% |
| 3-HHB-1 | 3% |
| 3-HHB-3 | 4% |
| 3-HHEB(F,F)-F | 8% |
| 3-HBEB(F,F)-F | 5% |

The above composition had the following characteristics.

| | |
|---|---|
| $T_{NI}$ = | 85.2° C. |
| $T_C$ < | −20° C. |
| η = | 33.9 mPa · s |
| Δn = | 0.145 |
| Vth = | 1.35 V |
| VHR(25) = | 98.4% |
| VHR(100) = | 94.8% |

This composition has a wide range of a liquid crystal phase, low η, large Δn, and a high V.H.R.

Example 10

As a first component,

| | |
|---|---|
| 3-BBB(F,F)CF2OB-OCF3 | 7% |

As a second component,

| | |
|---|---|
| 2-HB(F,F)CF2OB(F,F)-F | 2% |
| 2-BB(F,F)CF2OB(F,F)-F | 8% |
| 3-BB(F,F)CF2OB(F)-OCF3 | 2% |
| 3-HBB(F,F)CF2OB(F)-F | 2% |
| 2-HBB(F,F)CF2OB(F,F)-F | 3% |
| 3-HBB(F,F)CF2OB(F,F)-F | 10% |

As a third component,

| | |
|---|---|
| 5-HBB(F)B-2 | 3% |
| 5-HBB(F)B-3 | 2% |

As the other component,

| | |
|---|---|
| 3-HB-O2 | 7% |
| 3-HH-4 | 3% |
| 2-HHB-CL | 7% |
| 3-HHB-CL | 7% |
| 4-HHB-CL | 8% |
| 3-HHB-1 | 8% |
| 3-HHB-3 | 3% |
| 3-HGB(F,F)-F | 3% |
| 2-HBEB(F,F)-F | 3% |
| 3-HBEB(F,F)-F | 4% |
| 4-HBEB(F,F)-F | 4% |
| 5-HBEB(F,F)-F | 4% |

The above composition had the following characteristics.

| | |
|---|---|
| $T_{NI}$ | = 114.8° C. |
| $T_c$ | < −20° C. |
| η | = 37.2 mPa·s |
| Δn | = 0.135 |
| Vth | = 1.33 V |
| VHR (25) | = 98.2% |
| VHR (100) | = 94.4% |

This composition has a wide range of a liquid crystal phase, low η, large Δn, and a high V.H.R.

Example 11

As a first component,

| | |
|---|---|
| 2-BBB(F,F)CF2OB-3 | 3% |

As a second component,

| | |
|---|---|
| 3-HB(F,F)CF2OB(F,F)-CL | 5% |
| 3-BB(F,F)CF2OB(F,F)-F | 20% |

As a third component,

| | |
|---|---|
| 5-HBB(F)B-2 | 12% |
| 5-HBB(F)B-2 | 13% |

As the other component,

| | |
|---|---|
| 3-HB-O2 | 10% |
| 3-HH-4 | 10% |
| 3-HHB-CL | 5% |
| 4-HHB-CL | 6% |
| 5-HHB-CL | 6% |
| 3-HHB-1 | 5% |
| 3-HHB-3 | 3% |
| 3-HHB-F | 2% |

The above composition had the following characteristics.

| | |
|---|---|
| $T_{NI}$ | = 124.5° C. |
| $T_c$ | < −20° C. |
| η | = 28.8 mPa·s |
| Δn | = 0.146 |
| Vth | = 1.78 V |
| VHR (25) | = 98.5% |
| VHR (100) | = 95.3% |

This composition has a wide range of a liquid crystal phase, low η, large Δn, and a high V.H.R.

Example 12

As a first component,

| | |
|---|---|
| 3-BBB(F,F)CF2OB-F | 2% |
| 5-BBB(F,F)CF2OB-F | 3% |

-continued

| | |
|---|---|
| 2-BB(F,F)CF2OBB-3 | 2% |
| 3-BB(F,F)CF2OBB-3 | 3% |
| 3-BB(F,F)CF2OB-F | 5% |
| 5-BB(F,F)CF2OB-F | 5% |
| 3-BB(F)CF2OB-3 | 2% |
| 2-BB(F,F)CF2OB-3 | 8% |

As a second component,

| | |
|---|---|
| 3-HB(F,F)CF2OB(F,F)-F | 2% |
| 3-BB(F,F)CF2OB(F,F)-F | 19% |
| 3-BB(F,F)CF2OB(F)-CF3 | 2% |
| 3-HBB(F,F)CF2OB(F)-F | 3% |

As a third component,

| | |
|---|---|
| 5-HBB(F)B-2 | 12% |
| 5-HBB(F)B-3 | 13% |

As the other component,

| | |
|---|---|
| 3-HB-O2 | 10% |
| 7-HB-CL | 6% |
| 4-HHB-CL | 3% |

The above composition had the following characteristics.

| | |
|---|---|
| $T_{NI}$ = | 99.1° C. |
| $T_C$ < | −20° C. |
| η = | 33.8 mPa · s |
| Δn = | 0.165 |
| Vth = | 1.44 V |
| VHR (25) = | 98.4% |
| VHR (100) = | 95.4% |

This composition has a wide range of a liquid crystale phase, low η, large Δn, and a high V.H.R.

Example 13

As a first component,

| | |
|---|---|
| 3-BB(F)CF2OBB-3 | 2% |
| 2-BB(F,F)CF2OBB-3 | 5% |
| 3-BB(F,F)CF2OBB-3 | 5% |
| 3-BB(F,F)CF2OBB-F | 3% |
| 3-BB(F)CF2OBB-CL | 2% |
| 3-BB(F,F)CF2OB-F | 5% |
| 3-BB(F,F)CF2OB-CL | 3% |
| 2-BB(F,F)CF2OB-3 | 8% |
| 3-BB(F,F)CF2OB-3 | 7% |

As a second component,

| | |
|---|---|
| 3-HHB(F)-OCF3 | 3% |
| 3-HHB(F)-OCF2H | 2% |
| 3-H2HB(F)-CF3 | 2% |
| 3-H2HB(F)-OCF3 | 3% |

-continued

| | |
|---|---|
| 5-HH2B(F,F)-OCF3 | 3% |
| 3-HH2B(F,F)-OCF2H | 2% |
| 3-BB(F,F)CF2OB(F,F)-F | 5% |
| 3-BB(F,F)CF2OB(F)-OCF3 | 5% |

As a third component,

| | |
|---|---|
| 5-HBB(F)B-2 | 5% |

As the other component,

| | |
|---|---|
| 3-HB-O2 | 8% |
| 5-HB-CL | 2% |
| 3-HHB-1 | 9% |
| 3-HHEB(F,F)-F | 4% |
| 3-GHB(F,F)-F | 3% |
| 5-GHB(F,F)-F | 2% |
| 3-HGB(F,F)-F | 2% |

The above composition had the following characteristics.

| | |
|---|---|
| $T_{NI}$ = | 89.7° C. |
| $T_C$ < | −20° C. |
| η = | 33.9 mPa · s |
| Δn = | 0.142 |
| Vth = | 1.53 V |
| VHR (25) = | 98.4% |
| VHR (100) = | 94.7% |

This composition has a wide range of a liquid crystal phase, low η, large Δn, and a high V.H.R.

Example 14

As a first component,

| | |
|---|---|
| 3-BB(F,F)CF2OBB-CL | 3% |
| 3-BB(F,F)CF2OBB-OCF2H | 2% |

As a second component,

| | |
|---|---|
| 3-HBB(F)-F | 5% |
| 3-HBB(F,F)-CL | 5% |
| 3-HBB(F,F)-OCF3 | 3% |
| 3-HBB(F)-OCF2H | 2% |
| 3-H2BB(F)-OCF3 | 3% |
| 3-H2BB(F)-CF3 | 2% |
| 3-HBB(F,F)-F | 13% |
| 5-HBB(F,F)-F | 13% |
| 7-HBB(F,F)-F | 4% |
| 3-HB(F)B(F,F)-F | 3% |
| 3-HHBB(F,F)-F | 10% |
| 3-HB(F,F)CF2OB(F,F)-F | 2% |
| 3-HB(F,F)CF2OB(F)-OCF3 | 2% |
| 3-HB(F,F)CF2OB(F)-CL | 2% |
| 3-HBB(F,F)CF2OB(F)-CL | 2% |
| 2-HBB(F,F)CF2OB(F)-OCF3 | 3% |
| 3-HBB(F,F)CF2OB(F,F)-F | 10% |

As a third component,

| | |
|---|---|
| 5-HBB(F)B-2 | 6% |

As the other component,

| | |
|---|---|
| 3-H2B(F,F)-F | 5% |

The above composition had the following characteristics.

| | |
|---|---|
| $T_{NI}$ = | 98.3° C. |
| $T_C$ < | −20° C. |
| η = | 43.8 mPa · s |
| Δn = | 0.143 |
| Vth = | 1.39 V |
| VHR (25) = | 98.7% |
| VHR (100) = | 95.2% |

This composition has a wide range of a liquid crystal phase, low η, large Δn, and a high V.H.R.

UTILIZATION POSSIBILITY IN THE INDUSTRY

As shown by examples, a liquid crystal composition can be provided by the present invention which has a high voltage holding ratio at a high temperature region, and a wide range of a liquid crystal phase (a high clearing point and good miscibility at low temperature) in order to enhance contrast of a liquid crystal display device, low viscosity in order to accelerate response speed of the liquid crystal display device, and moderately large optical anisotropy in order to enhance contrast of the liquid crystal display device, while fulfilling general characteristics required for the liquid crystal composition of the AM-LCD.

What is claimed is:

1. A liquid crystal composition comprising at least one compound selected from the group of compounds expressed by formulae (1-1), (1-2) and (1-3) as a first component, and comprising at least one compound selected from the group of compounds expressed by formulae (2-1), (2-2), (2-3), (2-4), (2-5), and (2-6) as a second component,

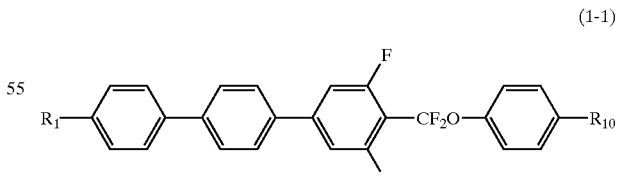

(1-1)

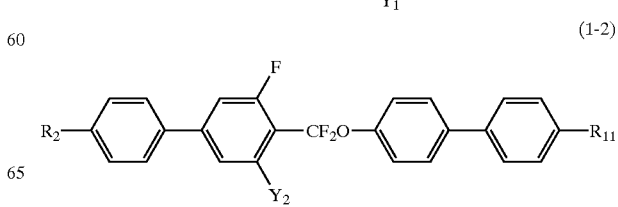

(1-2)

(1-3)
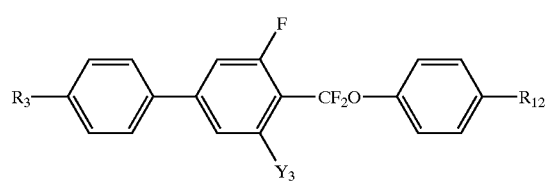

(2-1)
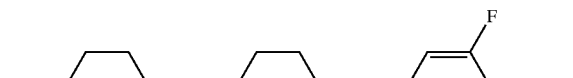

(2-2)
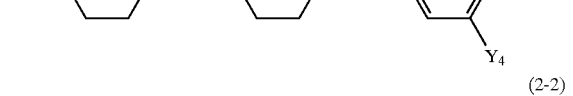

(2-3)
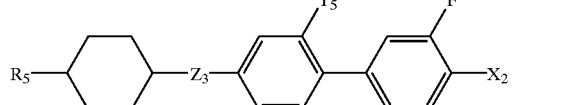

(2-4)
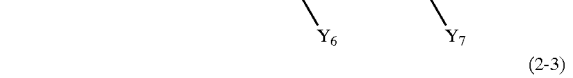

(2-5)
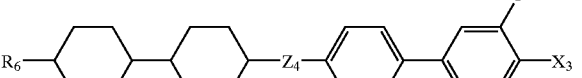

(2-6)

wherein $R_1$ to $R_9$ each independently represents alkyl or alkoxy having 1 to 10 carbon, alkenyl or alkoxymethyl having 2 to 10 carbon; $R_{10}$ to $R_{12}$ each independently represents alkyl or alkoxy having 1 to 10 carbon, alkenyl or alkoxymethyl having 2 to 10 carbon, F, Cl, $CF_3$, $OCF_3$, or $OCF_2H$; $X_1$ to $X_6$ each independently represents F, $CF_3$, $OCF_3$, $OCF_2H$ or Cl; $Y_1$ to $Y_{11}$ each independently represents H or F; $Z_1$ to $Z_4$ each independently represents a single bond or $-C_2H_4-$.

2. The liquid crystal composition according claim 1, which is comprising 3 to 45% by weight as the first component, and is comprising 25 to 97% by weight as the second component each based on the total weight of the liquid crystal composition.

3. A liquid crystal composition comprising at least one compound selected from the group of compounds expressed by formulae (1-1) to (1-3) as a first component, comprising at least one compound selected from the group of compounds expressed by formulae (2-1) to (2-6) as a second component, and comprising at least one compound selected from the group of compounds expressed by formula (3) as a third component, (1-1)
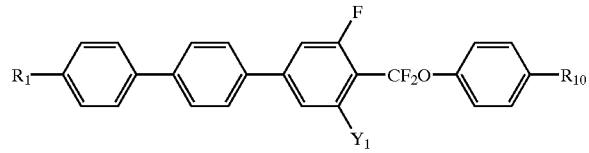

(1-2)
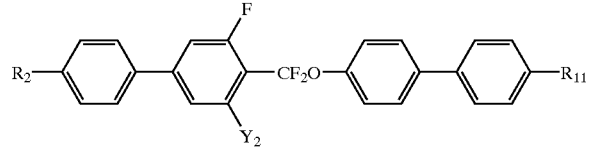

(1-3)
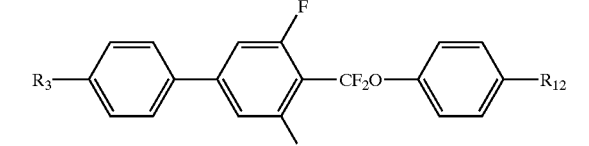

(2-1)
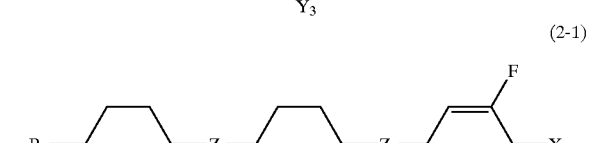

(2-2)
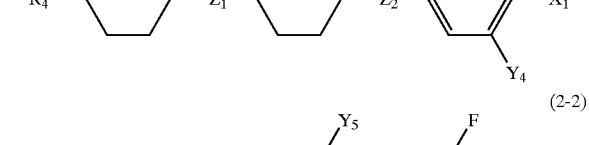

(2-3)
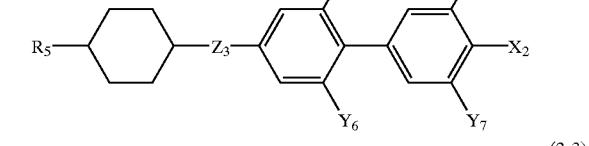

(2-4)
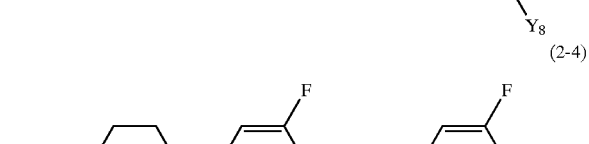

(2-5)

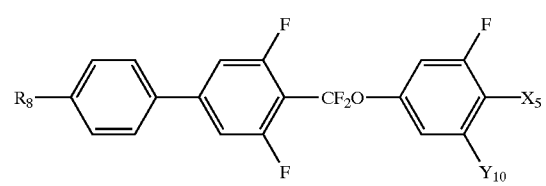

(2-6)

(3)

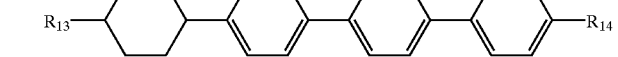

wherein $R_{13}$ and $R_{14}$ each independently represents alkyl having 1 to 10 carbon.

4. The liquid crystal composition according to claim 3 which is comprising 3 to 45% by weight of the first component, is comprising 25 to 97% by weight of the second component, and is comprising 25% and less by weight of the third component each based on the total weight of the liquid crystal composition.

5. The liquid crystal display device composed by using the liquid crystal composition defined in claim 1.

6. The liquid crystal display device composed by using the liquid crystal composition defined in claim 2.

7. The liquid crystal display device composed by using the liquid crystal composition defined in claim 3.

8. The liquid crystal display device composed by using the liquid crystal composition defined in claim 4.

wherein $R_1$ to $R_9$ each independently represents alkyl or alkoxy having 1 to 10 carbon, alkenyl or alkoxymethyl having 2 to 10 carbon; $R_{10}$ to $R_{12}$ each independently represents alkyl or alkoxy having 1 to 10 carbon, alkenyl or alkoxymethyl having 2 to 10 carbon, F, Cl, $CF_3$, $OCF_3$, or $OCF_2H$; $X_1$ to $X_6$ each independently represents F, $CF_3$, $OCF_3$, $OCF_2H$ or Cl; $Y_1$ to $Y_{11}$ each independently represents H or F; $Z_1$ to $Z_4$ each independently represents a single bond or —$C_2H_4$—,

* * * * *

UNITED STATES PATENT AND TRADEMARK OFFICE
CERTIFICATE OF CORRECTION

PATENT NO.     : 6,497,929 B1
DATED          : December 24, 2002
INVENTOR(S)    : Takahiro Miyairi et al.

It is certified that error appears in the above-identified patent and that said Letters Patent is hereby corrected as shown below:

Column 27,
Line 56, change "-O≡C-" to -- -C≡C- --.

Signed and Sealed this

Fifth Day of August, 2003

JAMES E. ROGAN
*Director of the United States Patent and Trademark Office*